United States Patent [19]
James et al.

[11] Patent Number: 5,829,035
[45] Date of Patent: Oct. 27, 1998

[54] SYSTEM AND METHOD FOR PREVENTING STALE DATA IN MULTIPLE PROCESSOR COMPUTER SYSTEMS

[75] Inventors: David V. James, Palo Alto; Glen D. Stone, San Jose; Donald N. North, Saratoga, all of Calif.

[73] Assignee: Apple Computer, Inc., Cupertino, Calif.

[21] Appl. No.: 941,807

[22] Filed: Oct. 3, 1997

Related U.S. Application Data

[63] Continuation of Ser. No. 577,867, Dec. 22, 1995, abandoned.

[51] Int. Cl.⁶ ..................................................... G06F 13/00
[52] U.S. Cl. .......................... 711/141; 711/144; 711/143; 707/201
[58] Field of Search ..................................... 711/141, 143, 711/144; 707/201

[56] References Cited

U.S. PATENT DOCUMENTS

| | | | |
|---|---|---|---|
| 5,247,648 | 9/1993 | Watkins et al. | 395/470 |
| 5,249,284 | 9/1993 | Kass et al. | 395/468 |
| 5,434,993 | 7/1995 | Liencres et al. | 395/460 |
| 5,524,233 | 6/1996 | Milburn et al. | 395/468 |
| 5,530,835 | 6/1996 | Vashi et al. | 395/474 |
| 5,530,933 | 6/1996 | Frink et al. | 395/468 |

Primary Examiner—Tod R. Swann
Assistant Examiner—David Langjahr
Attorney, Agent, or Firm—Fenwick & West LLP

[57] ABSTRACT

A multi-processor computer system comprising a data storage device, a memory controller, and a plurality of processors. The data storage device has a plurality of memory lines, each memory line having a portion for alternatively storing data or, a set of GONE codes, a count value, and a processor identification code value. A memory controller coupled to the data storage alternatively stores and retrieves data or the GONE code, the count field value and the processor identification code value. At least one of the processors includes a cache memory and a cache memory controller. The cache memory controller compares a GONE code associated with the requested memory line with the contents of the requested memory line, and requests the contents of the requested memory line from a second of the processors in response to the comparison.

23 Claims, 14 Drawing Sheets

SYSTEM AND METHOD FOR PREVENTING STALE DATA IN MULTIPLE PROCESSOR COMPUTER SYSTEMS

RELATED APPLICATIONS

This is a continuation of application Ser. No. 08/577,867 filed on Dec. 22, 1995 now abandoned.

BACKGROUND OF THE INVENTION

1. Field of the Invention

The present invention relates generally to computer systems having multiple processors with caches. In particular, the present invention relates to a system and method for implementing cache tags in a memory for maintaining cache coherence.

2. Description of the Background Art

The use of multiple processors is a recent trend in computer design. Each processor may work on a separate portion of a problem, or work on different problems, simultaneously. The processors used in the multi-processor architectures generally each have a cache. A cache is a relatively small group, when compared to shared memories, of high speed memory cells that are specifically dedicated to a processor. A processor's cache is usually on the processor chip itself or may be on separate chips.

Processors use caches to hold data that the processor has recently accessed. A memory access is any action, such as a read or a write, where a processor receives, modifies, or receives as well as modifies the contents of a memory location. Generally, a processor can access data in its cache faster than it can access data in the main memory of the computer. Furthermore, by using data in its cache, a processor does not use the bus of the computer system to access data. This leaves the bus free for use by other processors and devices.

A particular problem associated with the use of caches is that the data becomes "stale." A first processor may access data in the main memory and copy the data into its cache. The first processor may then modify the data in its cache. At the instant when the data in the cache of the first processor is modified, the corresponding data in the memory is stale. If a second processor subsequently accesses the original data in the main memory, the second processor does not find the most current version of the data. The most current version is in the cache of the first processor. The second processor, however, needs the most current version of the data. A prior art solution to this problem is for processors to eavesdrop on the bus. When the first processor detects the main memory access by the second processor for data that the first processor holds in its cache, the first processor inhibits the main memory and supplies the data to the second processor. In this way, a processor always receives the most current version of the data.

This prior art solution suffers from a number of problems. Computer architectures are moving to multiple-processor, multiple-bus configurations. The busses are coupled through an interface. For efficiency purposes, many signals on a bus are not transmitted across the interface to other busses. Among signals, which are not transmitted across the interface, are memory access signals where the path between source and target devices does not cross the interface. Many other devices also do not transmit all signals that they receive. For example, cross-bar switches, which concurrently connect multiple pairs of source and target ports, limit the transmission of memory access signals to the data path between source and target. When devices do not transmit all memory access signals over its data path, it is impossible for processors, which are not the source and target, to eavesdrop on memory accesses and therefore, impossible to determine when the data is stale. Thus, this prior art solution is not effective in systems that use devices that do not transmit all memory access signals.

Decreases in access time of main memories and increases in the size of caches have created other problems with eavesdropping. Eavesdropping on the bus assumes that a processor can inhibit the main memory and place the data on the bus faster than the main memory can access the data. Memories may, however, cache copies of recently accessed data within themselves; in which case, they often can provide data before a processor can inhibit the use of data returned from memory. Also, caches have become larger. Generally, larger memories, whether main memories or caches, require more time to access. Processors, with large caches, cannot access the larger cache fast enough to make the prior art solution workable unless other memory accesses are delayed while eavesdropping is performed. Such a delay would significantly degrade the performance of the processor.

Memory tags have been used to overcome some of these problems. A memory tag is associated with a memory address whose data is held in a cache. When a processor copies the data at that address into its cache, a memory tag is updated to identify the processor in whose cache the data is held. If a second processor attempts to access the data in the memory, the processor will receive the memory tag which redirects the second processor to fetch the data from the first processor cache. Thus, memory tags remove the need for eavesdropping. The memory tags are held in a separate memory device called a tag storage. When a processor reads or writes data to a memory address, both the tag storage and the memory address are accessed. The memory address is accessed for the data, and the tag storage is accessed to identify the owner, if any. If the accesses are performed sequentially, two accesses greatly slow the operation of the memory. If done in parallel, the tag storage greatly complicates the design of the memory controller. The width of the tag storage differs from the width of the main memory, in one embodiment the tag storage is 20 bits wide and the main memory is 64 bits wide. The different sized memories require complicated modifications to the memory controller. Furthermore, the tag storage requires changes in the bus width and requires additional devices that occupy space, consume power, and add to the expense of the computer system.

Referring now to FIG. 1, a block diagram of a prior art memory 23 is shown. The prior art memory 23 comprises a data storage 40, a tag storage 42, and a memory controller 25. The data storage 40 comprises a plurality of memory lines. Each memory line comprises one or more bytes and has a unique address. A first memory line 44 has address 0, and a second memory line 46 has address 1. Each address indicates a complete memory line. The remaining memory lines of the data storage 40 are addressed similarly so that a last memory line 48 has address N-1, where N is the total number of memory lines in the data storage 40. In a byte-addressable processor, the memory-line address is derived by dividing the byte address of the memory location by the number of bytes in the memory line 44, 46, 48. The tag storage 42 comprises a tag cell for each memory line of the data storage 40. Each tag cell has an address that corresponds to a memory line of the data storage 40. A tag cell 50 has an address 0 and corresponds to the first memory line 44. Similarly, a tag cell 52 has an address 1 and corresponds to a second memory line 46, and a tag cell 54 has address N-1 and corresponds to a final memory line 48. Each tag cell 50, 52, 54 is more than one bit wide and contains data that indicates if the data held in the corresponding memory line 44, 46, 48 is valid data or if a processor holds the data. Data is valid, or "fresh," if no processor holds the data in its cache. Fresh data may also be referred to as "unowned" data. Data is referred to in this application as "owned" and is not fresh if a processor holds a copy of the data in its cache. If a processor owns the data, the tag cell 50, 52, 54 contains an indicator the data is owned and a tag that identifies the processor that owns the data.

Any memory operation that requires the data held at an address is referred to as an access. The basic operations are ReadOwned and WriteReturn. ReadOwned and WriteReturn will be discussed in detail below. Those skilled in the art will recognize that there may be other operations as well. The processor that is executing an operation is referred to as the accessing processor. Every memory access requires an operation on the addressed memory line 44, 46, 48 and the assigned tag cell 50, 52, 54. This is true whether the memory access is a ReadOwned or a WriteReturn. If the access is a ReadOwned, the data storage 40 must be read, and the tag storage 42 must be read to determine if the data is fresh. If the memory access is a WriteReturn, the appropriate address must be written to and the assigned tag cell 50, 52, 54 must be set to indicate fresh data.

The memory controller 25 is a state machine for controlling the operation of the memory 23. The memory controller 25 is coupled to processors and other devices of a computer system by a bus 31. Data, control, and address signals are transmitted to the memory 23 on the bus 31. The memory controller is coupled to the data storage 40 by a memory line 27 and is coupled to the tag storage 42 by a memory line 29. In this application, a memory line refers to one or more wires. When the memory controller 25 receives a memory access signal, it must perform an operation on both the data storage 40 and the tag storage 42. For example, if the memory controller 25 receives a ReadOwned command on the bus 31 for a memory location in the data storage 40, the memory controller 25 first asserts a signal on memory line 27 for the data storage 40 to transmit the contents of the first memory line 44 to the memory controller 25. For purposes of this example, it will be assumed that the memory address was 0 for the first memory line 44. The data storage transmits the data on memory line 27. The memory controller 25 simultaneously asserts a signal on memory controller line 29 for the tag storage 42 to transmit the contents of tag cell 50 to the memory controller 25. The memory controller 25 determines if the data, received from the tag storage 42, indicates that the data contained in memory line 44 is owned. If the data contained in memory line 44 is unowned, the memory controller outputs the data onto the bus 31. If the data is owned, the memory controller 25 outputs the tag contained in the tag cell 50. In both cases, the tag is updated to identify the new owner. Other memory accesses such as WriteReturn also require an operation on both the data storage 40 and the tag storage 42. When compared to the present invention, this prior art memory 23 is slow and requires more complicated memory controller lines 27, 29.

As can be seen from the above example, there is a continuing need for a faster system and less-costly method for ensuring that processors receive fresh data and for identifying processors holding cached data. This system and method should be applicable to current devices of a computer system.

SUMMARY OF THE INVENTION

The present invention overcomes the deficiencies and limitations of the prior art with a system and method for controlling memory accesses in a multi-processor computer system. The present invention advantageously provides a system for storing data that identifies valid data and identifies data held in a processor's cache without a separate tag storage. The present invention also advantageously reduces the number of read functions that must be executed to access a memory location.

In one embodiment of the present invention each memory line comprises a check field, a count field, and a processor identification field. When a memory line contains unowned data, the data resides in the memory line as in a conventional memory device. That is, the check field, the count field, and the processor identification field are used to hold the data along with the rest of the memory line. In the present invention, for each read-owned memory access of the same address in the memory, the data that is stored in the memory line is transmitted to the requesting processor and then the data stored in the memory line is modified by incrementing the count field, setting the check field equal to a GONE value, and setting the processor identification field to a value representing the requesting processor to indicate that the requesting processor now owns the data. After receiving the data, the requesting processor determines if the data is unowned, truly-owned, or falsely-owned. If the data is unowned the processor can use the data immediately and becomes the new owner of the data. The data is unowned if the value in the check field is not equal to the GONE value. The data is truly-owned if the value in the check field is equal to the GONE value and no error code is generated when the data is subsequently fetched from the apparent owner. The data is falsely-owned if the check field is equal to the GONE value but the apparent owner generates a failed coherency status code. If the data is falsely-owned, then the requesting processor determines that the data received from memory is valid.

DETAILED DESCRIPTION OF THE PREFERRED EMBODIMENTS

Several alternate embodiments and a preferred embodiment of the present invention are now described with reference to the figures where like reference numbers indicate identical or functionally similar elements.

Figure 2:
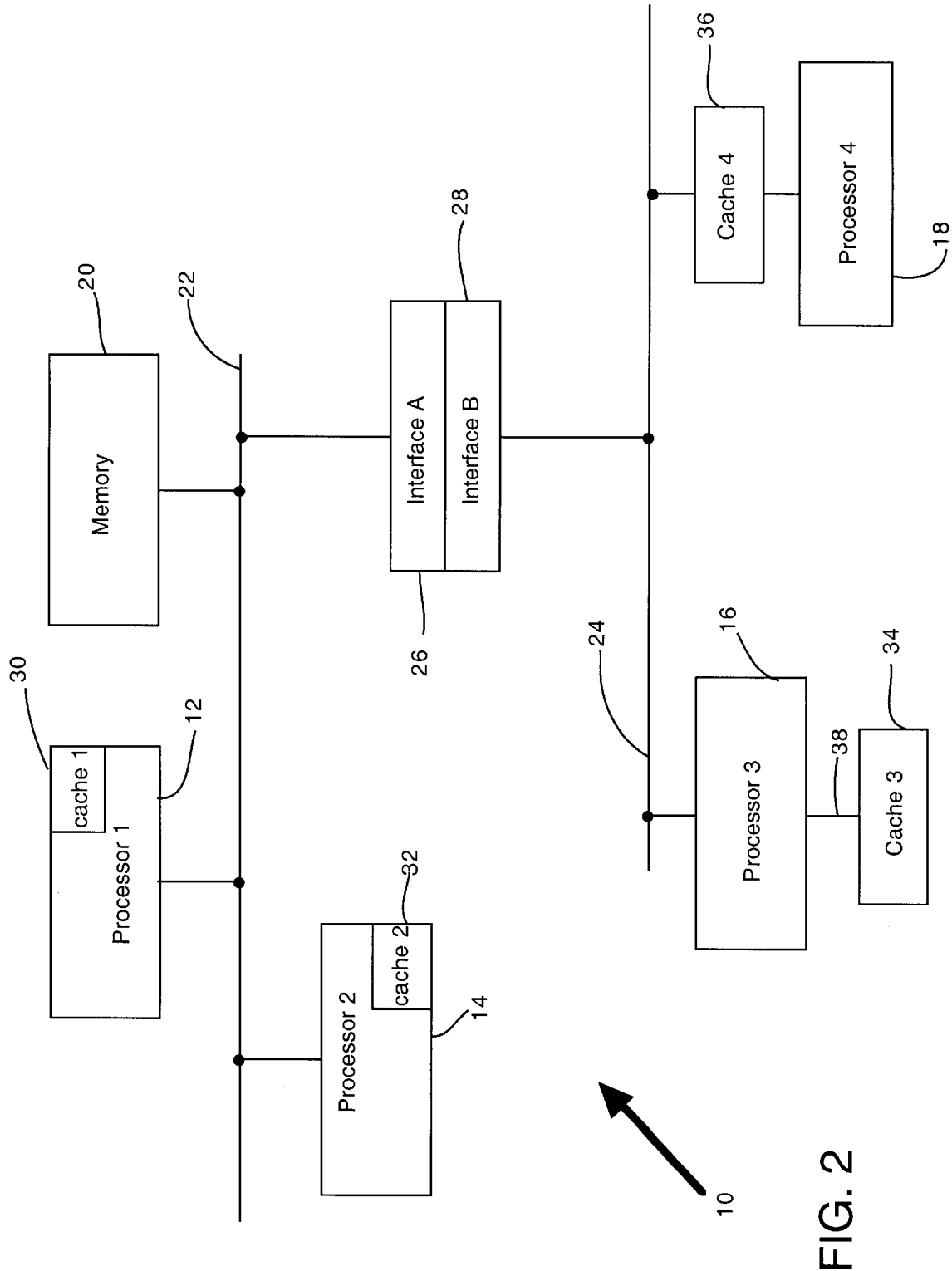
FIG. 2 is a block diagram of an exemplary multi-processor, multi-bus computer system.

Referring now to FIG. 2, a block diagram of a computer system 10 is shown. While the system 10 will now be described with reference to 4 processors, those skilled in the art will realize that the present invention applies to any system having a plurality of processors. The computer system 10 comprises a first processor 12, a second processor 14, a third processor 16, a fourth processor 18, and a memory 20. The first processor 12, second processor 14, and memory 20 are coupled by a first bus 22, and the third processor 16 and fourth processor 18 are coupled by a second bus 24. The first bus 22 and the second bus 24 are coupled by an A interface 26 and a B interface 28. The A interface 26 is coupled to the first bus 22, and the B interface 28 is coupled to the second bus 24.

In an exemplary embodiment, the processors 12, 14, 16, 18 are PowerPC processors from Motorola Corporation of Schaumberg, Ill. The processors 12, 14, 16, 18 may alternately be Alpha Processors from the Digital Equipment Corporation of Maynard, Mass. or any other microprocessor capable of being used in a multi-processor computer system. The first processor 12 and second processor 14 each has an integrated cache 30 and 32 respectively. An integrated cache 30, 32 is a group of memory cells that are integrated into the same circuit or chip as the processor 12 and 14. The third processor 16 has an off chip cache 34. The off chip cache 34 is integrated in a separate circuit and is coupled to the third processor 16 by a line 38. The fourth processor 18 has an in-line cache 36 that is coupled between the fourth processor 18 and the second bus 24. Each cache 30, 32, 34, 36 holds data for its processor 12, 14, 16, 18. Each processor 12,14, 16, 18 can generally access data in its cache 30, 32, 34, 36 faster than it can access data in the memory 20. Furthermore, by accessing data in its cache 30, 32, 34, 36, a processor 12, 14, 16, 18 does not utilize the bus 22, 24. Thus, leaving the bus 22, 24 free for use by other devices. Those skilled in the art will recognize that other memory access devices such as direct memory access (DMA) capable input/output (I/O) devices behave like a processor. In addition, those skilled in the art will recognize that there are other ways to connect a cache memory to a processor.

The memory 20 comprises random access memory ("RAM"). The memory 20 holds data and program instruction steps for the processors 12, 14, 16, 18. The memory 20 will be described in greater detail with reference to FIGS. 2, 3, 4, and 5.

The A interface 26 and B interface 28 are conventional interfaces similar to IEEE Std 1596 Scalable Coherent Interfaces. The A interface 26 and B interface 28 do not transmit memory access commands for which they are not in the transfer path. For example, the A interface 26 and B interface 28 would transfer memory access commands from the third processor 16 or the fourth processor 18 to the memory 20 since the path between processors 16 and 18 and memory 20 is through the interfaces 26, 28. The interfaces 26, 28, however, would not transmit memory access commands from the first processor 12 or second processor 14 since the interfaces 26, 28 are not in the path between these processors 12, 14 and the memory 20. Thus, the third processor 16 and fourth processor 18 cannot eavesdrop on accesses of the memory 20 by the first processor 12 or the second processor 14.

Figure 3:
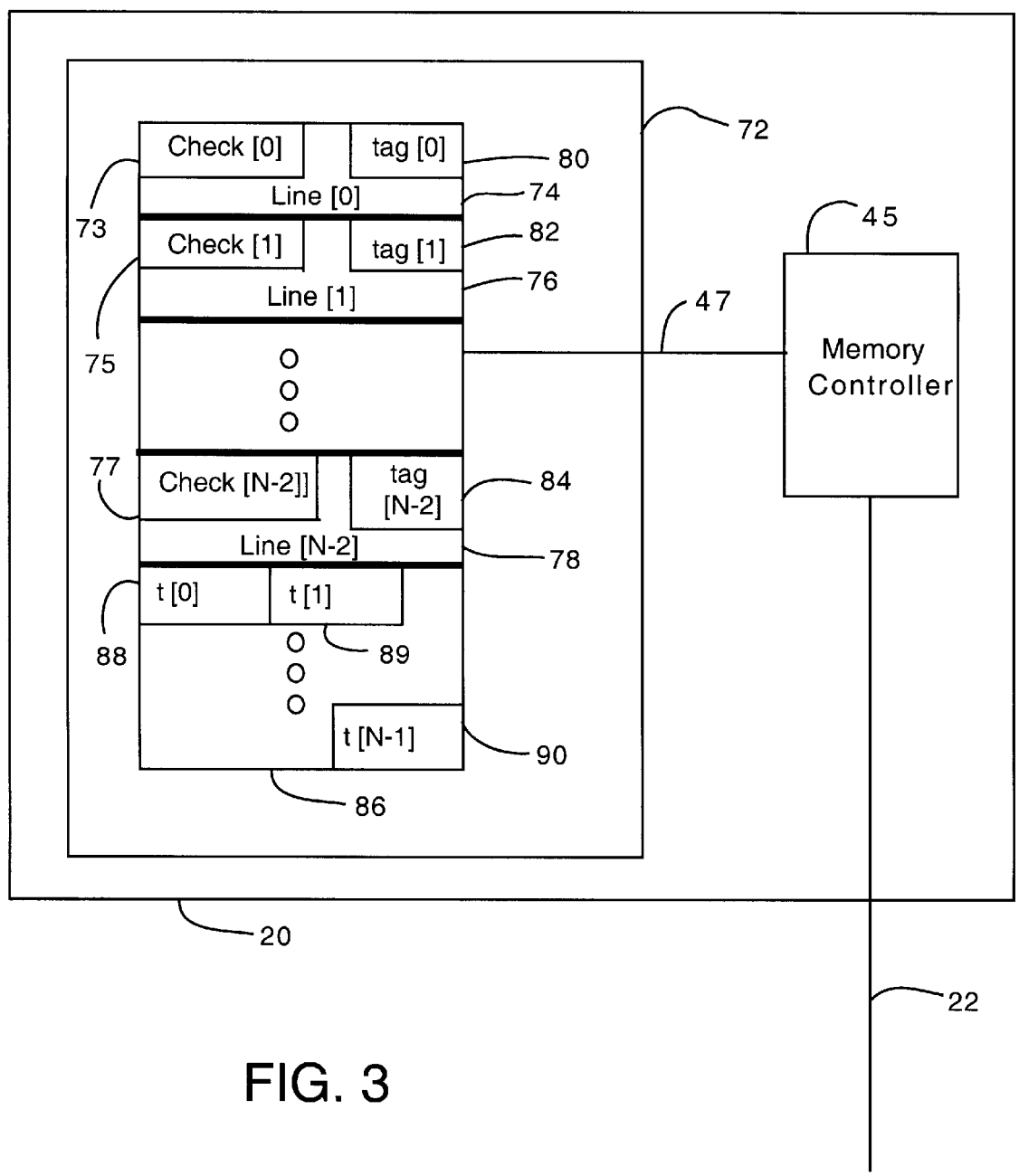
FIG. 3 is a block diagram of a memory constructed according to the present invention.

Referring now to FIG. 3, a block diagram of a first embodiment of the memory 20 constructed in accordance with the present invention is shown. The memory 20, shown in FIG. 3, comprises a data storage 72 and a memory controller 45. The data storage 72 comprises a plurality of memory lines. As before, each memory line 74, 76, 78 has an address. A memory line 74 has address 0; a memory line 76 has address 1; and a memory line 78 has address N-1. The data storage 72 includes N memory lines and an additional N tag bits, one tag bit associated with each memory line. Each memory line 74, 76, 78 may hold data or a tag. Tags are contained in a tag field of a first word of each memory line 74, 76, 78. Tags are coded identifiers of the owning processor 12, 14, 16, 18. Memory line 74 has a tag field 80. Similarly, memory lines 76 and 78 have tag fields 82 and 84, respectively. This first embodiment advantageously uses any portion of data storage 72 for the t bit storage 86. The t bit storage 86 comprises a plurality of t bit fields. Each t bit field of the t bit storage 86 is assigned to a memory line 74, 76, or 78. For example, a first t bit field 88 is assigned to memory line 74, a second t bit field 89 is assigned to memory line 76, and a t bit field 90 is assigned to memory line 78. A t bit field 88, 89, 90 is preferably 1 bit wide, and holds a T bit value that indicates whether a memory line 74, 76, 78 holds data or a tag. For clarity, the term "t-bit" refers to a t bit field, while "T bit" refers to the value in a t bit field.

The memory controller 45 controls the operation of the first embodiment of the memory 20 and is coupled to the data storage 72 by a line 47. The memory controller 45 contains combinational logic circuits and data storage device. If the memory controller 45 receives a ReadOwned signal for the first memory line 74, the memory controller 45 first asserts a signal on the line 47 for the data storage 72 to transfer the contents of t bit field 88 back to the memory controller 45. The memory controller 45 then determines if the T bit value indicates that the data is owned. For example if the T bit value is a 1, then the data is owned. If the T bit value is a 0, then the data is unowned. If the data is owned, the memory controller 45 signals the data storage 72 to transfer the contents of the first memory line 74 to the memory controller 45, and the memory controller 45 outputs the tag, contained in the tag field 80, onto the bus 22 along with a signal that the data is owned. If the data is not owned, the memory controller 45 outputs the contents of the first memory line 74 onto the bus 22 along with a signal that the data is not owned.

This first embodiment of the present invention eliminates the need for a separate t bit storage 86 and the accompanying problems of controller design. Two operations must still be executed, however, whenever a memory line 74, 76, 78 is accessed. In this first embodiment, the t bit storage 86 is much smaller than the tag storage 42.

Figure 4:
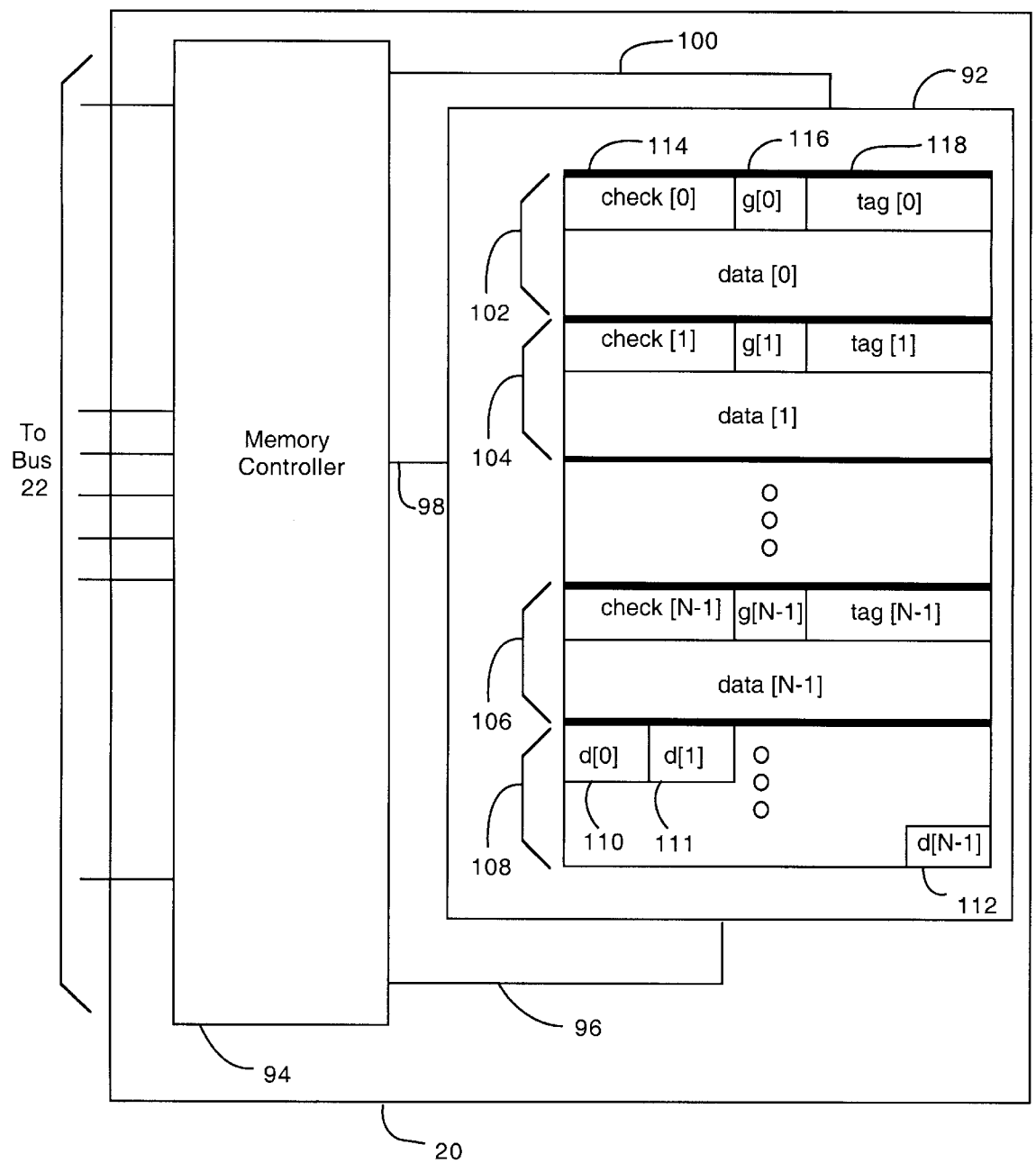
FIG. 4 is a block diagram of a second embodiment of a memory constructed according to the present invention.

Referring now to FIG. 4, a second embodiment of the memory 20, constructed according to the present invention, is shown. The memory 20 comprises a data storage 92 and a memory controller 94. The memory controller 94 is coupled to the bus 22 to receive data, address, and control signals and is coupled to the data storage 92 by a first line 96 for address signals, a second line 98 for control signals, and a third line 100 for data signals. Alternately, the memory controller 94 may be coupled to the data storage 92 by a single line. In this alternate embodiment, the single line would be used sequentially for data, address, and control signals. The memory controller 94 interprets incoming signals, determines if data contained in the data storage 92 is fresh or is owned by another processor 12, 14, 16, or 18, and generates and outputs data, address, and control signals on the bus 22.

The data storage 92 comprises a plurality of memory lines. Each memory line has an address. Memory line 102 has address 0; memory line 104 has address 1; and memory line 106 has address N-1. N is the number of memory lines in the data storage 92. Each memory line 102, 104, 106 comprises one or more words, all memory lines 102, 104, 106, however, have the same number of words. Whenever an address is accessed, all words of the memory line 102, 104, 106 at the address are accessed. For example, if the first memory line 102 is being read, all words of the memory line 102 are output by the memory 20. While the words may have any number of bits, currently and preferably each word comprises 64 bits. A portion of the data storage 92 is used for storing D bits. FIG. 4 shows a memory storage 108 of the data storage 92 being used for holding D bits. Any portion of the data storage 92 may be dedicated to contain D bits. Each D bit is one bit in length and is contained in a d bit field. The d bit fields are arranged according to the memory lines 102, 104, 106 to which they are assigned. For example, a d bit field 110 is assigned to memory line 102; a d bit field 111 is assigned to memory line 104; and a d bit field 112 is assigned to memory line 106. Each memory line between memory line 104 and memory line 106 also has an assigned d bit field. The D bits will be explained in greater detail below.

According to the present invention, a first word of each memory line has 3 fields. As can be seen with reference to the first memory line 102 of FIG. 4, the first word has a check field 114, a g bit field 116, and a tag field 118. The check field 114, g bit field 116, and tag field 118 are used in two different ways. First, if the first memory line 102 is not owned, then the check field 114, g bit field, and tag field 118 of the first word are used to contain data. Second, if the memory line 102 is owned, the first word is used to contain the tag. The g bit field 116 is at least one bit in length, and the bits of the check field 114, g bit field 116, and tag field 116 total 64 in the exemplary embodiment that will be described. In the exemplary embodiment, the check field 114 is 32 bits in length, and the tag field 118 is 31 bits in length. In other applications, the lengths may be different. The check field 114 contains a code that indicates whether the data held in memory line 102 is owned by a processor 12,14,16, 18. The code is preferably generated by the memory controller 94. If the code is held in the check field 114, then the data may be owned by a processor 12, 14, 16, 18. If the code is not contained in the check field 114, then the memory line 102 contains unowned data, and the contents of the check field 114, g bit field 116, and tag field 118 are a part of the data. There is a rare case where the check field 114 holds unowned data that happens by chance to match the code. If the data is owned by a processor 12, 14, 16, 18, then the tag field 118 holds an identification of the owning processor 12, 14, 16, 18. The g bit field 116 is required for the rare situations where unowned data contained in the first memory line 102 matches the code that is normally contained in the check field 114 and used to indicate that the data is owned by a processor 12, 14, 16, 18. When data is owned by a processor 12, 14, 16, 18, the check field 114 holds the code indicating ownership, and the g bit field 116 contains a 1. If the data is not owned but the data stored in the check field 114 matches the code used to indicate that the data is owned, the g bit field 116 contains a 0. In this case, the g bit field 116 contains a 0 regardless of whether the actual data is a 1 or a 0, and the d bit field 110 is set to hold the actual data value of the G bit. Thus for most memory accesses, the present invention requires only one read function. Only when the data in the check field 114 matches the code used to indicate ownership and the g bit field 116 holds a 0, must there be a second read function to determine the true data value of the G bit. In this case the true data value of the G bit is obtained from the assigned D bit.

The code contained in the check field 114 and used to indicate that the data is owned may be any code. Preferably, the code is the result of a hashing function where the input to the hashing function is the address of the first memory line 102. For example, when using a 32-bit address, a 32-bit hashing function may be an exclusive-or of the address and the bit-reversed version of the address. Alternately, when using a 64 bit address, a 32-bit hashing function may be an exclusive-or of the even bits and the bit-reversed odd bits. There are many other hashing functions that may be employed with the present invention, and those skilled in the art will recognize these functions.

The present invention advantageously eliminates the need to eavesdrop on memory accesses by other processors 12, 14, 16, 18. Whenever a processor 12, 14, 16, 18 accesses a memory address, the processor 12, 14, 16, 18 either receives valid data or receives the identity of the processor 12, 14, 16, 18 that owns the valid data. The present invention does this without having to modify the size or shape of the memory 20 or bus 22. The present invention is particularly advantageous because the unique field system of check fields, G bit fields, and tag fields greatly improves the performance of the memory controller. While the prior art required two memory controller accesses of the data storage to provide the data and even more for outputting the tag, the present invention is able to provide the data or the tag in a majority of instances with only a single access of the data storage. Only in the rare instances when the data stored happens to match the code for the memory line, will a second access of the data storage by the memory controller be necessary to determine the data to be output to the accessing processor 12, 14, 16, 18.

Figure 5:
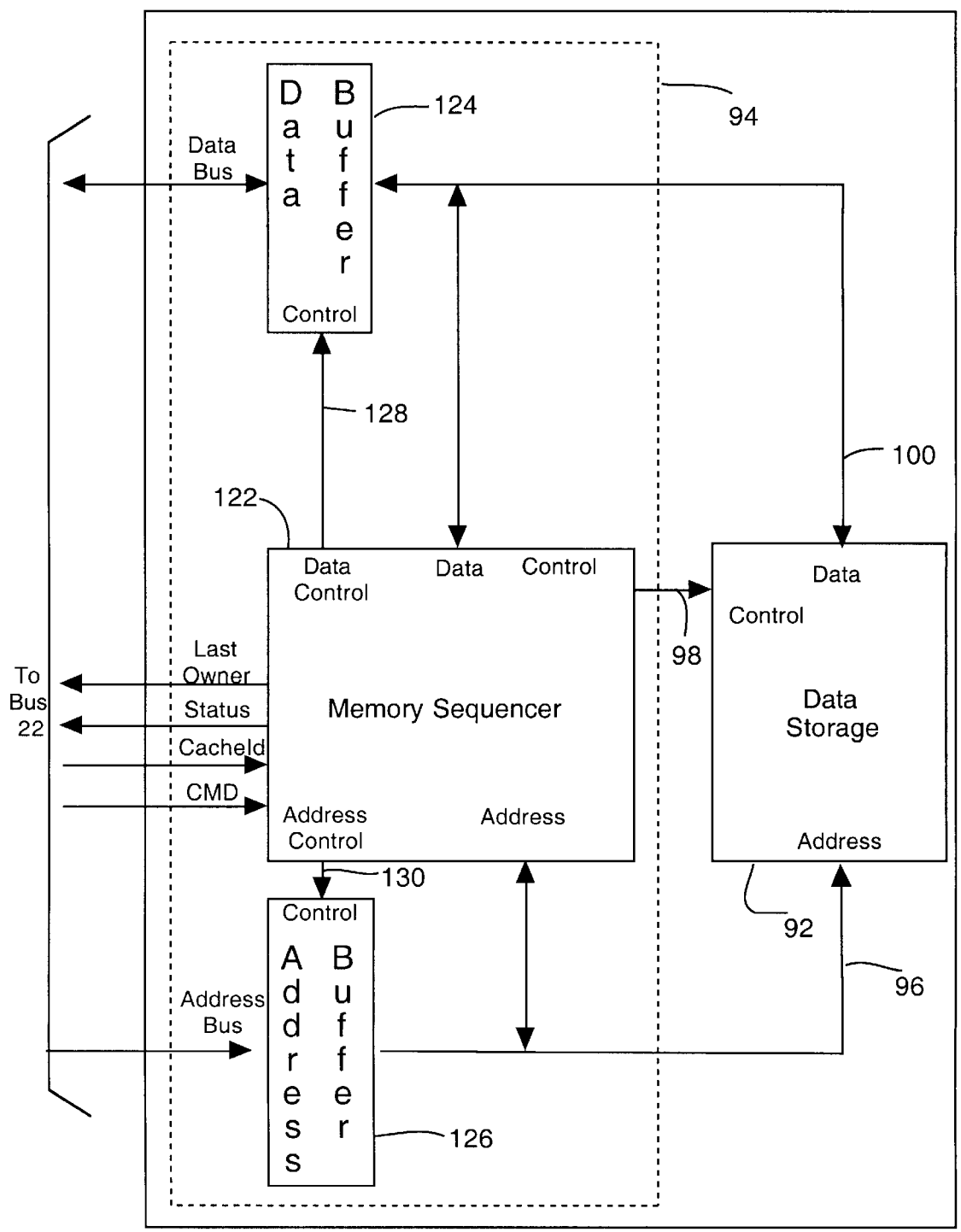
FIG. 5 is a block diagram of the second embodiment of the memory and associated control circuitry constructed according to the present invention.

Referring now to FIG. 5, a block diagram of the second embodiment of the memory 20, with the memory controller 94 in detail, is shown. The memory controller 94 comprises a memory sequencer 122, a data buffer 124, and an address buffer 126. The memory controller 94 may include other elements of conventional memories such as systems for refreshing the memory; these conventional elements may alternatively be in another structure. The data buffer 124 is a conventional buffer for receiving digital data. The data buffer 124 has a first input/output and a second input/output and a control input. The first input/output and the second input/output are bi-directional, that is they may either receive or transmit digital data. The first input/output is coupled to the data bus of the bus 22 to receive and transmit data signals. The second input/output of the data buffer 124 is coupled to the data storage 92 by line 100. Similarly, the address buffer 126 is a conventional buffer for storing addresses. The address buffer 126 has an input, which is coupled to the address bus of the bus 22, for receiving addresses, a control input, and an output. The output of the address buffer 126 is coupled to the data storage 92 by line 96.

The memory sequencer 122 is a state machine that receives signals and generates signals for controlling accesses to the data storage 92. The memory sequencer 122 comprises combinational logic and data storage devices to implement its functions. Those skilled in the art will realize how to construct a memory sequencer 122 from the inputs, outputs, and states that are described below. The memory sequencer 122 has a first input/output, coupled to the address buffer 126 and to the data storage 92 by line 96, for receiving and transmitting addresses. A second input/output is coupled to the data buffer 124 and to the data storage 92 by line 100. The memory sequencer 122 receives and outputs data signals through the second input/output. The memory sequencer 122 has a first output for transmitting control signals to the data storage 92. The first output is coupled to the data storage by line 98. The memory sequencer 122 transmits data-buffer control signals to the data buffer 124 through a second output. The second output is coupled to the data buffer 124 by a line 128. A third output of the memory sequencer 122 transmits address buffer control signals and is coupled to the address buffer 126 by a line 130. The memory sequencer 122 outputs signals indicating the identity of a processor 12, 14, 16, 18 that owns data that another processor 12, 14, 16, 18 is attempting to access onto the control bus of the bus 22 through a fourth output. The fourth output is coupled to the control bus of the bus 22 and is labeled "Last Owner." Often when a processor 12, 14, 16, 18 attempts to access memory line 102, that processor 12, 14, 16, 18 becomes the new owning processor 12, 14, 16, 18 that is identified in the tag field 118. If another processor 12, 14, 16, 18 already owns the data, the accessing processor 12, 14, 16, 18 will request the data from the prior owner. Thus, the accessing processor 12, 14, 16, 18 becomes the new owner. For this reason, the fourth output of the memory sequencer 122 is labeled "Last Owner." The memory sequencer 122 has a fifth output that is coupled to the control bus of the bus 22. The memory sequencer 122 outputs a Status signal, which indicates the success of the memory access, through the fifth output. If another processor 12, 14, 16, 18 owns the data, the memory sequencer 122 generates and outputs, through the fifth output, a DIFF Status signal. If the data is unowned, the memory sequencer 122 generates and outputs, through the fifth output, a NONE Status signal. The memory sequencer 122 generates and outputs a SAME status signal in certain situations. The memory sequencer 122 would generate the SAME Status signal if the accessing processor 12, 14, 16, 18 is the processor identified in the tag field 118 as the owning processor 12, 14, 16, 18.

The memory sequencer 122 has a first input, which is coupled to the control bus of the bus 22, through which the memory sequencer 122 receives the identity of the processor 12, 14, 16, 18 which is attempting a memory access, and the memory sequencer 122 has a second input, also coupled to the control bus of the bus 22, through which the memory sequencer 122 receives the command of the processor 12, 14, 16, 18. The first input is labeled CacheId, and the second input is labeled CMD.

The two basic commands are ReadOwned and WriteReturn. The ReadOwned command is used when the accessing processor 12, 14, 16, 18 is to become the owning processor 12, 14, 16, 18 on the completion of the command. The WriteReturn command is used when the accessing processor 12, 14, 16, 18 is to write data that becomes unowned. If a processor 12, 14, 16, 18 attempts a ReadOwned command on data that another processor 12, 14, 16, 18 owns, the accessing processor 12, 14, 16, 18 becomes the owning processor 12, 14, 16, 18 and a DIFF Status signal is generated. The accessing processor 12, 14, 16, 18 then requests the data from the last owning processor 12, 14, 16, 18. If a processor 12, 14, 16, 18 attempts a ReadOwned on unowned data, a NONE Status signal is generated, the data is returned to the accessing processor 12, 14, 16, 18, and the accessing processor 12, 14, 16, 18 becomes the owner of the data. If a processor 12, 14, 16, 18 attempts a ReadOwned command on data it owns, a SAME Status signal results and no data is returned. This is usually an error condition. When a WriteReturn command is issued on data that is owned by the accessing processor 12, 14, 16, 18, the data, from the accessing processor 12, 14, 16, 18, is written at the memory location, a SAME Status signal is generated, and the data becomes unowned. When a WriteReturn command is issued on data owned by a processor 12, 14, 16, 18 other than the accessing processor 12, 14, 16, 18, a DIFF Status signal is generated, and neither ownership nor the data held in the memory 20 is modified. Finally, when a WriteReturn command is issued on unowned data, a NONE Status signal is generated, and the data is not modified. This last situation is usually an error situation. There are two additional commands that are closely related to the ReadOwned and WriteReturn commands. These commands are ReadFresh and WriteCheck. The ReadFresh command is used when unowned data is to be read and is to remain unowned when the command is completed. The ReadFresh command is similar to the ReadOwned command, but when the ReadFresh command is executed on unowned data, the data remains unowned. The WriteCheck command is used to update unowned data when that data is to remain unowned. If the WriteCheck command is issued on data owned by a processor 12, 14, 16, 18 other than the accessing processor, a DIFF Status signal is generated, the line is modified so that ownership changes to the accessing processor 12, 14, 16, 18. If a WriteCheck command is issued on unowned data, the data in the memory line is modified, a NONE Status signal is generated, and the data in the memory line remains unowned. Finally, the WriteCheck command results in a SAME Status signal and usually an error situation when issued on data owned by the accessing processor 12, 14, 16, 18. There are many other possible commands. From the commands described here, those skilled in the art will recognize these commands.

Figure 6:
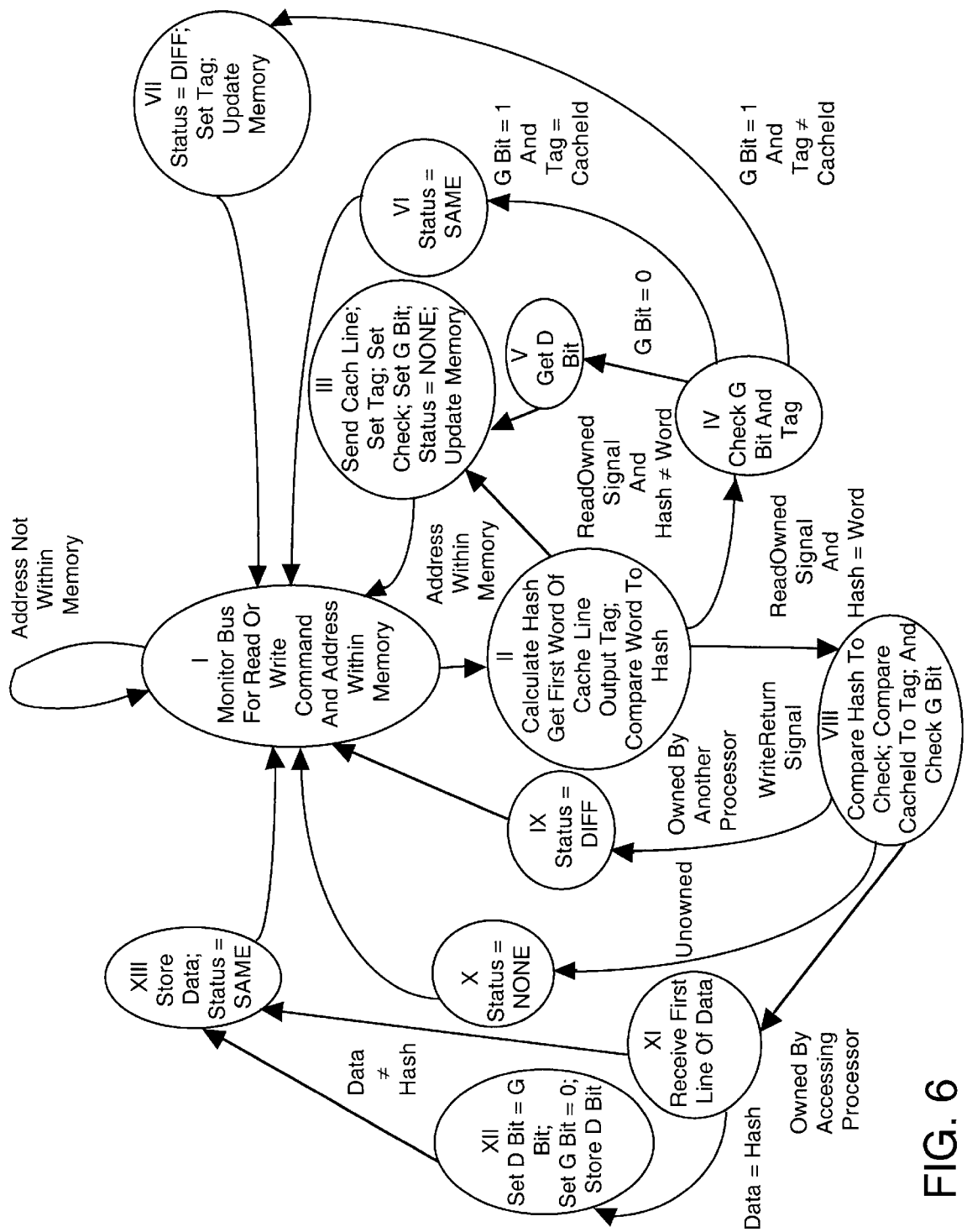
FIG. 6 is a state diagram of the states of a memory sequencer of the second embodiment of present invention.

Referring now to FIG. 6, a state diagram for an exemplary embodiment of the memory sequencer 122 is shown. FIG. 6 shows the significant states of the memory sequencer 122; other states may be necessary to implement fully the memory sequencer 122. These additional states will be understood by those skilled in the art. FIG. 6 shows the significant states for the ReadOwned and WriteReturn commands. Those skilled in the art will recognize the states necessary for other commands. The memory sequencer 122 receives command signals through its CMD input, address signals through the input to the address buffer 126, and a CacheId signal through its CacheId input. The CacheId signal identifies the accessing processor 12, 14, 16, 18. When the memory sequencer 122 receives a ReadOwned, WriteReturn, or other appropriate command signal, the memory sequencer 122 generates a signal and asserts the signal on line 130 for the address buffer 126 to capture the address and to transfer the address to the memory sequencer 122. The address buffer 126 transfers the address by asserting a signal on line 96, which is coupled to the address input/output of the memory sequencer 122. The memory sequencer 122 then analyzes the address to determine if the address is for a location within the data storage 92. As shown in FIG. 2, the computer system 10 has only one memory 20.

Computer systems may, however, have multiple memories. Where a computer system has multiple memories, the memory sequencer 122 must determine if the address is within its data storage 92. If the address is not for an address within its data storage 92, the memory sequencer 122 remains in state I.

If the address is for a location within the data storage 92, the memory sequencer 122 enters state II. For this explanation, it will be assumed that the received address is 0, and the memory line to be accessed is the first memory line 102. Those skilled in the art will realize how the description applies to all memory lines of the data storage 92. In state II, the memory sequencer 122 generates the code for the address 0. As described above with reference to FIG. 5, the memory sequencer 122 preferably uses a hashing function to generate the code for the address. The memory sequencer 122 then generates a signal instructing the data storage 92 to output the first word of the addressed first memory line 102 to the memory sequencer 122. The memory sequencer 122 transmits the signal to this data storage 92 on line 98, and in response, the data storage 92 transmits the first word to the memory sequencer 122 on line 100. The memory sequencer 122 outputs the data contained in the tag field 118 of the first word, through its Last Owner output, onto the control bus of the bus 22. Note that the memory sequencer 122 has not yet determined if memory line 102 is owned by a processor 12, 14, 16, 18. If the first memory line 102 is not owned, the tag that has been output is meaningless and will be ignored. If the first memory line 102 is owned, the data in the tag field 118 identifies the owning processor and will be used by the accessing processor 12, 14, 16, 18. Once the memory sequencer 122 has output the data from the tag field 118 through the Last Owner output, it compares the data in the check field 114 to the code that it just generated. The memory sequencer 122 then transitions out of state II.

If the memory sequencer 122 received a ReadOwned command at its CMD input and the code does not match the data contained in the check field 114, the memory sequencer 122 transitions from state II to state III. In this case, the first memory line 102 is not owned by any processor 12, 14, 16, 18, since the code is not equal to the data held in the check field 114. In state III, the memory sequencer 122 asserts a signal on line 98 instructing the data storage 92 to output the contents of the first memory line 102 onto line 100. The memory sequencer 122 then asserts a signal on line 128 for the data buffer 124 to receive the data and to output the data onto the data bus of the bus 22. This is done for each word until the entire contents of memory line 102 have been transferred to the bus 22. The first memory line 102 is now owned by the accessing processor 12, 14, 16, 18. The memory sequencer 122 signals the data storage 92 to store the code, which the memory sequencer 122 determined in state II, in the check field 114, to set the G bit in the g bit field 116 to 1, and to store the identity of the accessing processor 12, 14, 16, 18 in the tag field 118. The memory sequencer 122 received the identity of the accessing processor 12, 14, 16, 18 through its CacheId input. Finally, the memory sequencer 122 generates a NONE Status signal and asserts this signal onto the control bus through the Status output. The memory sequencer 122 then leaves state III and returns to state I.

If in state II, the memory sequencer 122 determines that the code matches the data held in the check field 114 and the memory sequencer 122 received a ReadOwned signal, the memory sequencer 122 enters state IV. The first memory line 102 may be owned by a processor 12, 14, 16, 18; it is also possible that the data contained in check field 114 simply matches the code. In state IV, the memory sequencer 122 gets the G bit from the g bit field 116. The memory sequencer 122 has already obtained the first word from the data storage 92 in state II. If the G bit is 0, the first memory line 102 is unowned and the memory sequencer 122 proceeds to state V. In state V, the memory sequencer 122 signals the data storage 92 to transfer the value of the D bit for the first memory line 102, which is held in the d bit field 110, to the memory sequencer 122. The memory sequencer 122 then sets the value contained in the g bit field 116 of the data to be asserted on the bus equal to the value of the D bit and proceeds to state III. This is the very rare occurrence where the present invention must make two reads to accomplished the memory access. This only occurs when the data held in a memory line is unowned, and the data held in the check field happens by chance to match the code.

If in state IV, the G bit, contained in the g bit field 116, is equal to 1, the memory sequencer 122 checks the tag held in the tag field 118. If the tag matches the CacheId received at the CacheId input, the memory sequencer 122 moves to state VI. In this case, the first memory line 102 is owned by the accessing processor 12, 14, 16, 18. The data held in the first memory line 102 may not be read since it is owned. In state VI, the memory sequencer 122 generates a SAME Status signal and asserts the signal on the control bus through the Status output. A SAME Status signal indicates that a memory line is owned by the accessing processor 12, 14, 16, 18 and usually indicates an error condition. The memory sequencer 122 then returns to state I.

If in state IV the G bit is 1 and the tag does not match the CacheId received at the CacheId input, the memory sequencer 122 enters state VII. As in State VI, the data in the first memory line 104 of the data storage 92 is not valid data. The memory sequencer 122 generates and outputs a DIFF Status signal. The DIFF Status signal indicates that the first memory line 104 is owned. The memory sequencer 122 already output the identity of the owning processor 12, 14, 16, 18 when it output the contents of the tag field 118 in state I. The accessing processor 12, 14, 16, 18 will receive the DIFF Status signal along with the contents of the tag field 118, and the accessing processor 12, 14, 16, 18 will then be able to obtain the valid data by requesting the data from the owning processor 12, 14, 16, 18. The memory sequencer 122 then signals the data storage 92 to store an identifier for the accessing processor 12, 14, 16, 18 in the tag field 118. The accessing processor 12, 14, 16, 18 now becomes the owner of the first memory line 102. The memory sequencer 122 then returns to state I.

In state II, if the memory sequencer 122 received a WriteReturn signal in state I, the memory sequencer 122 moves to state VIII. With the WriteReturn command, only an owning processor 12, 14, 16, 18 may write to a memory line. In state VIII, the memory sequencer 122 compares the code determined in state II from the address to the code contained in the check field 114 and compares the CacheId signal received from the control bus to the tag held in the tag field 118. The memory sequencer 122 also determines if the G bit contained in the g bit field 116 is a 1. If the first memory line 102 is owned by another processor 12, 14, 16, 18, then the memory sequencer 122 moves to state IX. The first memory line 102 is owned by another processor 12, 14, 16, 18 if the code held in the check field 114 matches the code that the memory sequencer 122 generated from the address in state II, if the G bit contained in the g bit field 114 is 1, and if the tag held in the tag field 118 does not match the CacheId signal received from the control bus. If any one of these three conditions is not met, then the first memory line 102 is not owned by another processor 12, 14, 16, 18 and the memory sequencer 122 does not enter state IX. In state IX, the memory sequencer 122 generates a DIFF Status signal and asserts this signal on the control bus of the bus 22. The memory sequencer 122 then returns to state I.

If, in state VIII, the first memory line 102 is unowned, the memory sequencer 122 moves to state X. An accessing processor may only perform a write owned access to a memory line owned by itself. The first memory line 102 is unowned if one of two conditions is met. The first condition is that the code, held in the check field 114, does not match the code generated in state II. The second condition is that the code, held in the check field 114, matches the code generated in state II, but the G Bit, held in the g bit field 116, is a 0. In-state X, the memory sequencer 122 generates a NONE Status signal. As was explained above, this is usually an error condition. The memory sequencer 122 then returns to state I.

If, in state VIII, the first memory line 102 is owned by the accessing processor 12, 14, 16, 18, the memory sequencer 122 enters state XI. The first memory line 102 is owned by the accessing processor 12, 14, 16, 18 if three conditions are met. The first condition is the code held in the check field 114 matches the code generated by the memory sequencer 122 from the address in state II. The second condition is the G bit, held in the g bit field 116, is a 1. The third condition is the CacheId signal, received from the control bus, matches the tag held in the tag field 118. If these three conditions are met, the memory sequencer 122 proceeds to state XI.

In state XI, the memory sequencer 122 generates a signal and asserts the signal on line 128 for the data buffer 124 to transfer the first word of the data to be written in the first memory line 102 to the memory sequencer 122. The memory sequencer 122 then compares the code generated in state II to the data received from the data buffer 124. Note that in state VIII, the memory sequencer 122 compared the code to the data contained in the check field 114. In state XI, however, the memory sequencer 122 is comparing the code to the first 32 bits of the first word of the data that is entering the memory 20. The memory sequencer 122 is not comparing the code to the data already held in the memory 20. When a processor 12, 14, 16, 18 writes data to the memory 20 the data becomes unowned. The memory sequencer 122 must, however, determine if the data, by chance, matches the code. If the first 32 bits of the first word match the code, the memory sequencer 122 moves to state XII. In state XII, the memory sequencer 122 sets the D bit to the value of the G bit of the first word and records this value in the d bit field 110. The memory sequencer 122 then assigns to the G bit the value of 0.

From state XII or, if the data did not match the code, from state XI, the memory sequencer 122 enters state XIII. In state XIII, the memory sequencer 122 first generates a signal instructing the data storage 92 to store the incoming data in the first memory line 102. The first word is transmitted from the memory sequencer 122, the remainder is transmitted from the data buffer 124. The memory sequencer 122 then generates a SAME Status Signal. The SAME Status signal indicates to the accessing processor 12, 14, 16, 18 that the WriteReturn was successful. The memory sequencer 122 then returns to state I.

Figure 7A:
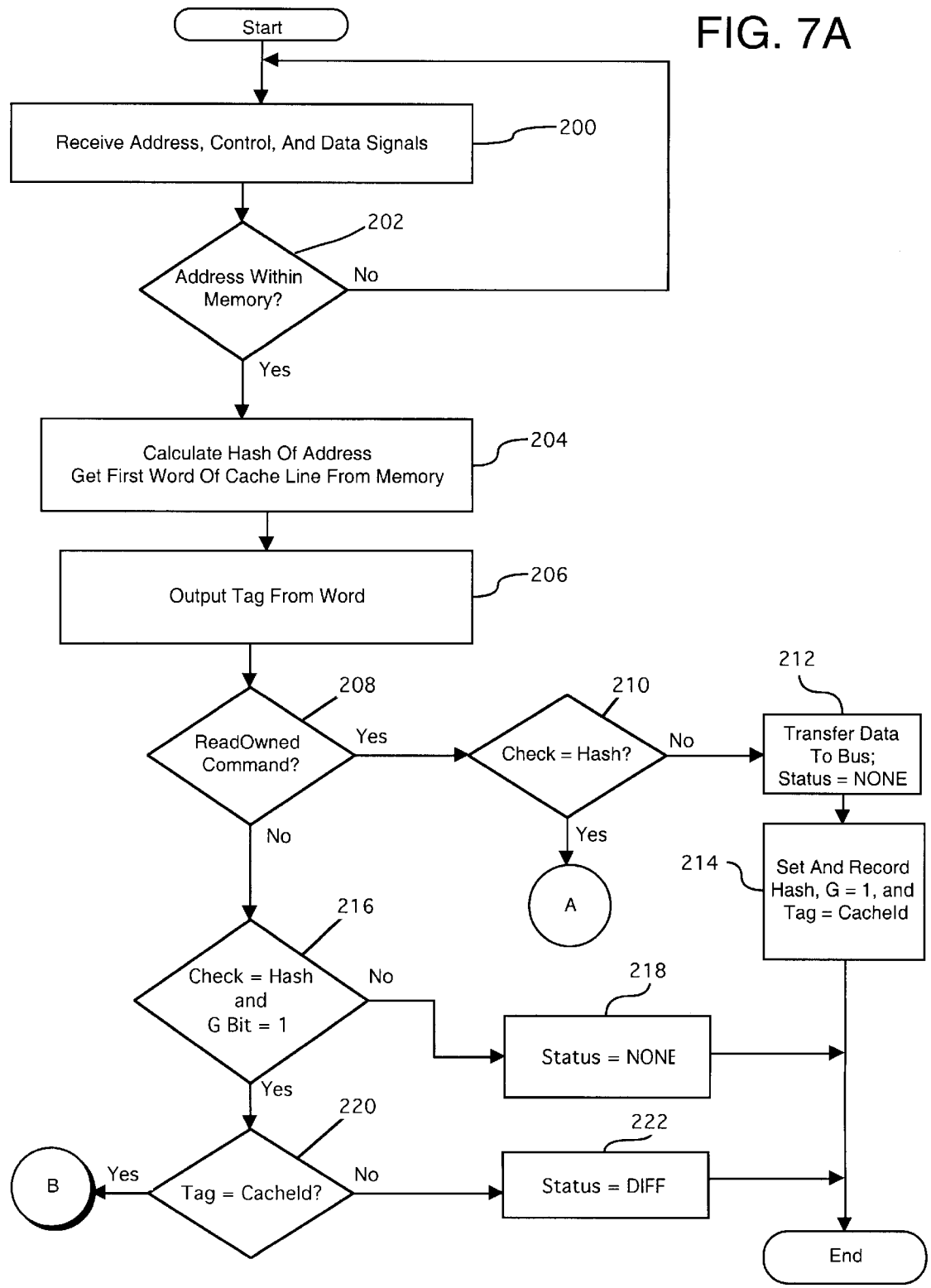
FIGS. 7A, 7B, and 7C are flow charts showing a method for accessing a memory device according to the second embodiment of present invention.
Figure 7B:
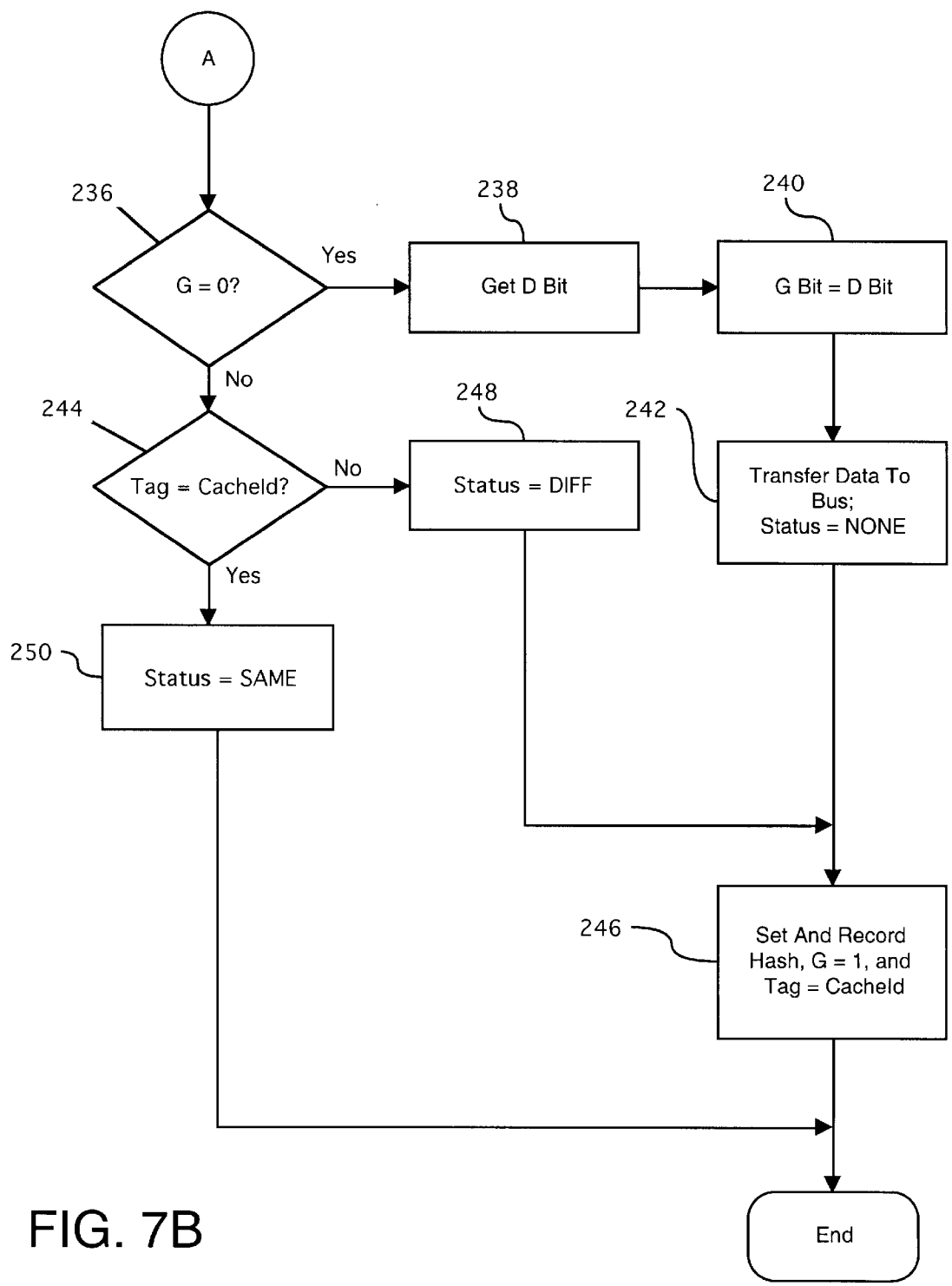
Figure 7C:
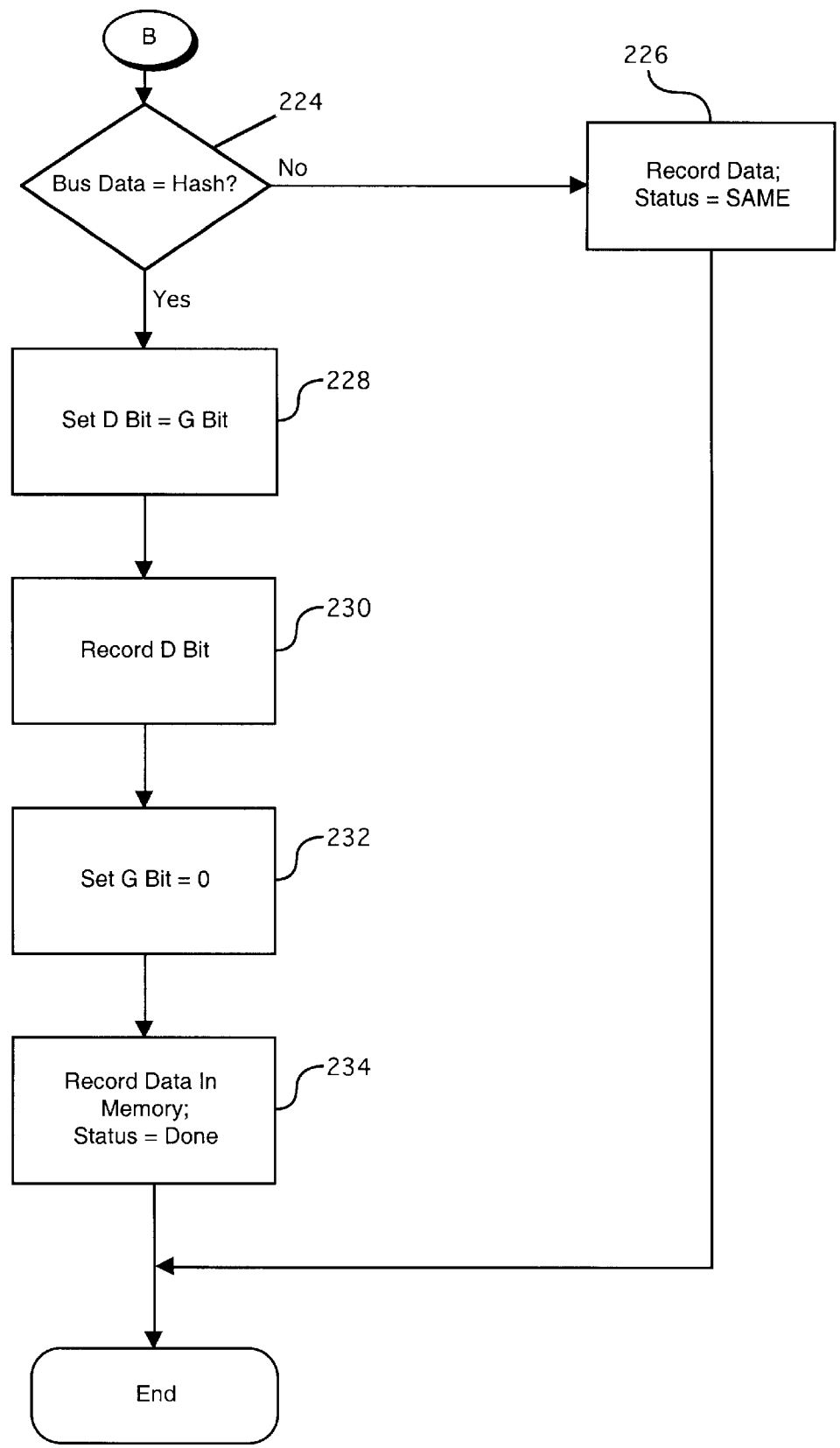

Referring now to FIGS. 7A, 7B, and 7C, flow charts of a method for accessing a memory utilizing the second embodiment of the present invention are shown. The method begins in step 200 where a memory sequencer 122 receives address, control, and data signals. The memory sequencer 122 receives an address signal, a command signal, and a CacheId signal that identifies the accessing processor 12, 14, 16, 18. In step 202, the memory sequencer 122 determines if the address is within its associated data storage 92. If the address is not within the data storage 92, the method returns to step 200 to await another address. If the address is within the data storage 92, the method moves to step 204.

In step 204, the memory sequencer 122 determines a code from the address. The memory sequencer 122 may use any method for generating the code. The memory sequencer 122 preferably uses a hashing function to generate the code. For example, if a 32 bit address is used, the memory sequencer 122 may use an exclusive-or of the address and the bit-reversed version of the address. Alternately, if a 64 bit address is used, the memory sequencer 122 may use an exclusive-or of the even bits of the address and the bit-reversed version of the odd bits. There are many other hashing functions that may be used; those skilled in the art will recognize these functions. Also in step 204, the memory sequencer 122 signals for and receives the first word of data contained in the addressed memory line. In this description it will be assumed that the address was 0 and the first memory line 102 is to be accessed. Those skilled in the art will recognize how the method applies to all memory lines of the data storage 92.

In step 206, the memory sequencer 122 outputs, through its Last Owner output, onto the control bus of the bus 22, data held in a tag field 118 of the first memory line 102. If the first memory line 102 is owned, then the tag identifies the owning processor 12, 14, 16, 18 to the accessing processor 12, 14, 16, 18. If the first memory line 102 is not owned, then the tag will be ignored. In step 208, the memory sequencer 122 determines if the control signal received through its CMD input is a ReadOwned command. The memory sequencer 122 operations depends on the command signals on the bus 22, e.g., ReadOwned, WriteOwned. For this description it will be assumed that there are only two memory operations, ReadOwned and WriteReturn. Those skilled in the art will realize how the method may be modified for other memory operations such as ReadFresh, WriteCheck, and others. If the command is a ReadOwned command, the method moves to step 210 where the memory sequencer 122 compares the code, determined in step 204, to the data contained in the check field 114. If the code does not match the data contained in the check field 114, the memory sequencer 122, in step 212, signals the data storage 92 and data buffer 124 to output the contents of the first memory line 102 onto the data bus of the bus 22. The memory sequencer 122 also generates and outputs, through its Status output, onto the control bus a NONE Status signal. In step 214, the memory sequencer 122 signals the data storage 92 to store the code, generated in step 204, in the check field 114, a 1 in the g bit field 116, and the CacheId, received from the control bus through the CacheId input, in the tag field 118. This identifies the first memory line 102 as owned by the accessing processor 12, 14, 16, 18 which was identified by the input through the CacheId input. The method then ends.

If in step 210 the code did not match the data held in the check field 114, the method continues in step 236 of FIG. 7B. In step 236, the memory sequencer 122 determines if the G bit is equal to 0. The G bit is held in the g bit field 116. If the G bit is equal to 0, the method continues in step 238. This is the rare situation where the data contained in memory line 102 is not owned, but the data held in the check field 114, by chance, matches the code generated from the address for memory line 102. This is the situation where a second read function must be executed. In step 238, the memory sequencer 122 signals the data storage 92 to read the D bit contained in the d bit field 110 and to provide the D bit to the memory sequencer 122. In step 240, the memory sequencer 122 sets the G bit equal to the D bit. Since the data contained in the memory line 102 is not owned and the data contained in the check field 112 happened to match the code, the G bit was forced to 0. This 0 value for the G bit indicates that the data is not owned. The D bit is the actual data value of the bit occupied by the G bit. By setting the G bit equal to the D bit before outputting the data, the memory sequencer 122 restores the true value of the bit occupied by the G bit. Next, in step 242, the memory sequencer 122 transfers the first word of the first memory line 102, with the restored D bit, to the data buffer 124 and signals the data buffer 124 and data storage 92 to output the contents of the first memory line 102 onto the data bus of the bus 22. The memory sequencer 122 also generates and outputs a NONE Status signal.

The memory sequencer 122 then, in step 246, signals the data storage 122 to store the code, generated in step 204, in the check field 114, a 1 in the g bit field 116, and the CacheId, received from the control bus through the CacheId input, in the tag field 118. This identifies the first memory line 102 as owned by the accessing processor 12, 14, 16, 18 which was identified by the input through the CacheId input. The method then ends.

If in step 236 the G bit was not equal to 0, then the first memory line 102 is owned by a processor 12, 14, 16, 18 and the data storage 92 does not have valid data. The accessing processor 12, 14, 16, 18 must request the data from the owning processor 12, 14, 16, 18. In step 244, the memory sequencer 122 determines if the CacheId signal matches the tag held in the tag field 118. If the CacheId signal matches the tag, the method continues in step 250. In step 250, the memory sequencer 122 generates and outputs a SAME Status signal. This is usually an error condition, and the method ends. If in step 244 the tag does not match the CacheId input, the memory sequencer 122 generates, in step 248, a DIFF Status signal and outputs this signal onto the control bus of the bus 22. The accessing processor 12, 14, 16, 18 will receive this signal and, having already received the tag output in step 206, will request the data from the owning processor 12, 14, 16, 18. The memory sequencer 122 assumes that the accessing processor 12, 14, 16, 18 will receive the data from the owning processor 12, 14, 16, 18. Therefore, the method proceeds to step 246 where the memory sequencer 122 identifies the first memory line 102 as owned by the accessing processor 12, 14, 16, 18. The method then ends.

If in step 208 the command is not a ReadOwned command, the command must be a WriteReturn command. In step 216 the memory sequencer 122 determines if the data contained in the check field 114 matches the code and if the G bit, held in the g bit field 116, is 1. If either condition is false, then the first memory line 102 is not owned. This is usually an error condition. In step 218, the memory sequencer 122 generates and outputs a NONE Status signal. After step 218, the method ends.

If both conditions of step 216 are true, the first memory line 102 is owned. In step 220, the memory sequencer 122 determines if the data contained in the tag field 118 matches the CacheId received through the CacheId input. If the tag matches the CacheId, then the accessing processor 12, 14, 16, 18 is the owner. If there is no match, the memory sequencer 122 generates a DIFF Status signal in step 222, outputs the DIFF Status signal, and the method ends.

If the accessing processor 12, 14, 16, 18 is the owner, then the method continues in step 224 of FIG. 7C. In step 224, the memory sequencer 122 determines if the first bits of the incoming data match the code. Note that the memory sequencer 122 is comparing the incoming data to the code. In step 216, the memory sequencer 122 compared the data already contained in the first memory line 102 to the code. If there is no match in step 224, the memory sequencer 122 signals, in step 226, the data buffer 124 and data storage 92 to store the data in the first memory line 102. The memory sequencer 122 generates and outputs a SAME Status signal, and the method ends. If in step 224 there is a match, the memory sequencer 122 sets the D bit equal to the G bit in step 228. The memory sequencer 122 then in step 230 signals the data storage to store the D bit in the d bit field 110. In step 232, the memory sequencer 122 sets the G bit equal to 0, and in step 234 the memory sequencer 122 signals the data buffer 124 and data storage 92 to store the data in the first memory line 102. The data storage 92 stores the data with the G bit set to 0. The memory sequencer 122 then generates and outputs a SAME Status signal, and the method ends.

Figure 1:
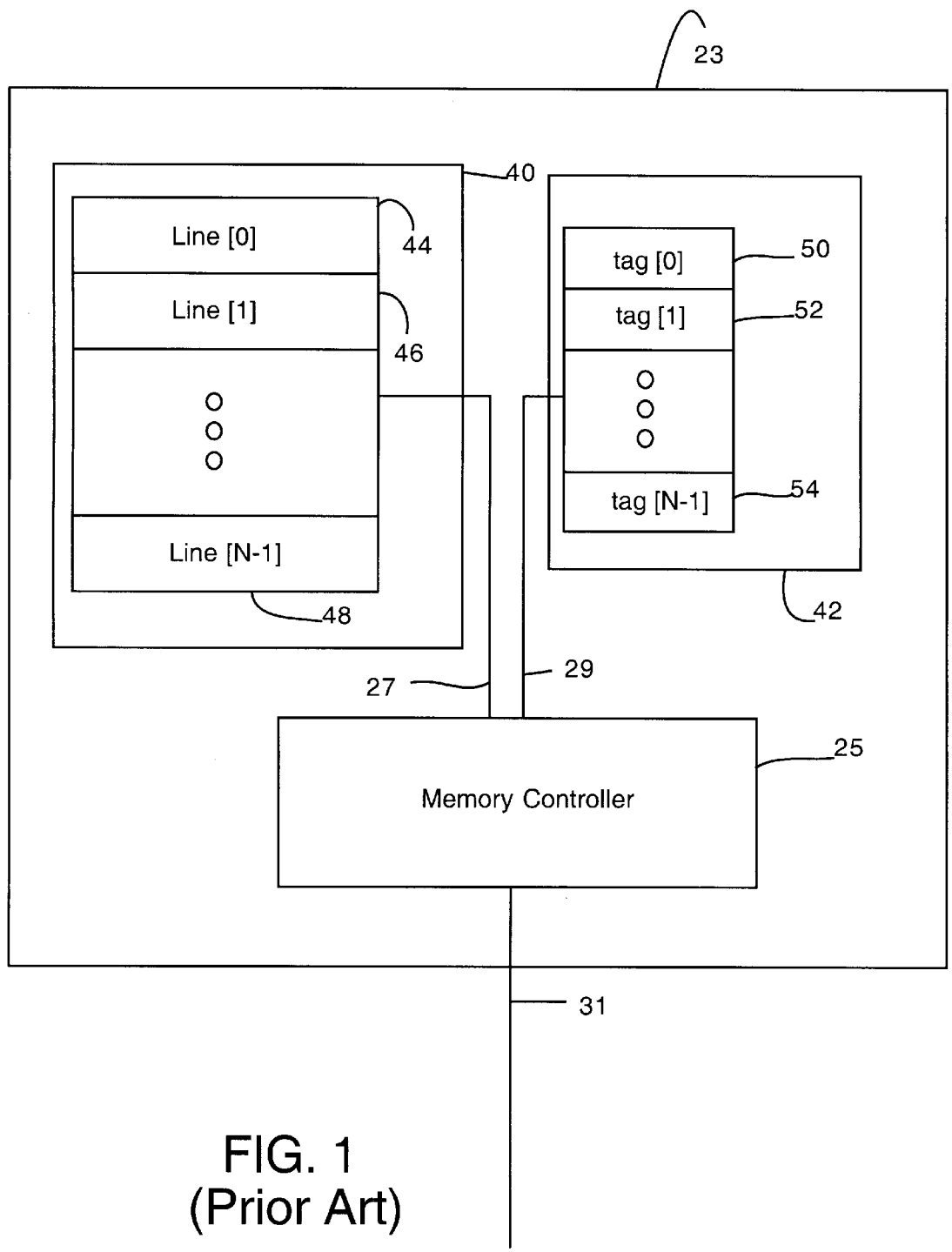
FIG. 1 is a block diagram of a prior art system of a main memory and a memory for storing memory tags that identify processors holding data.
Figure 8:
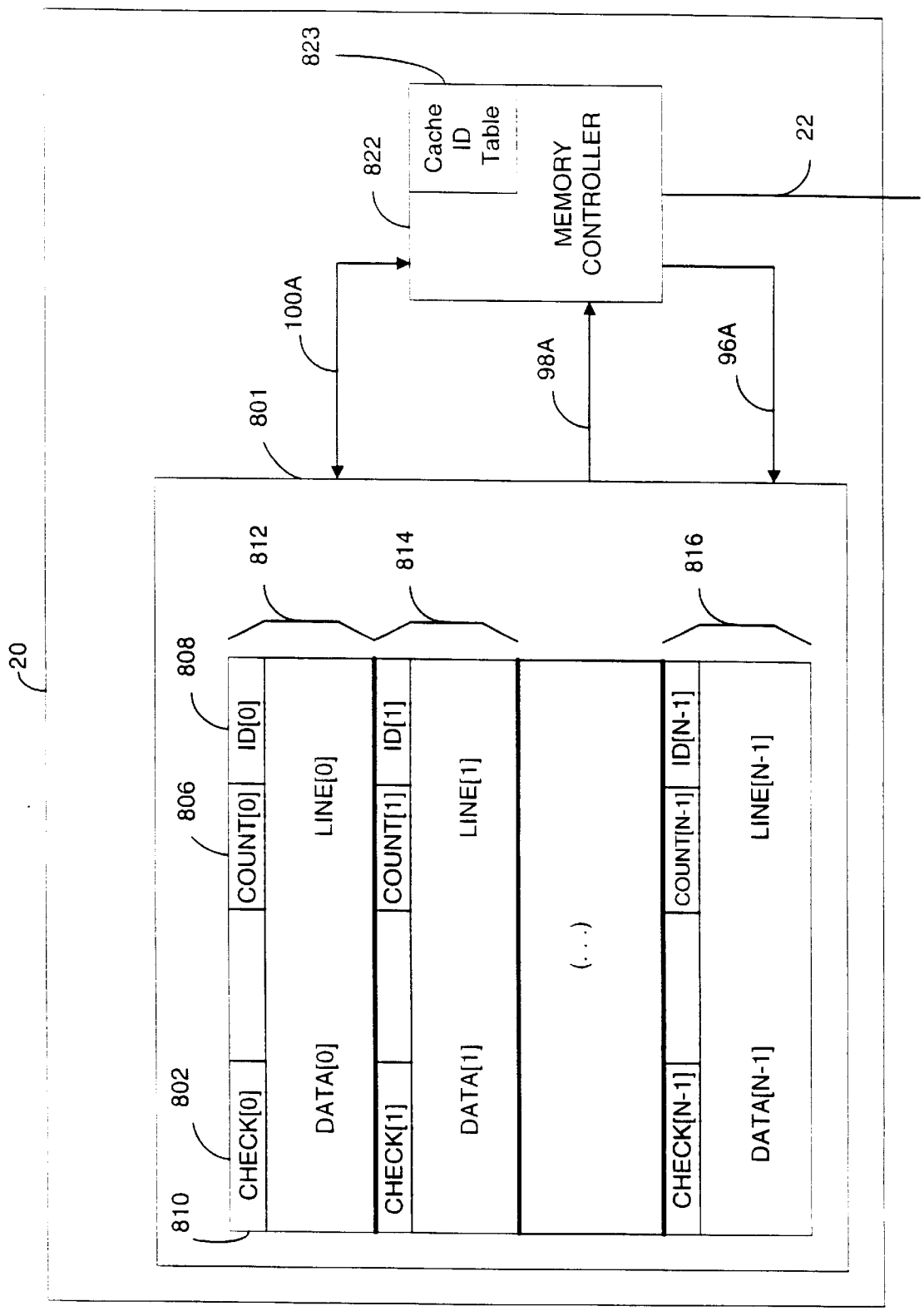
FIG. 8 is a block diagram of a third embodiment of the memory constructed according to the present invention.

A third embodiment of the memory system of present invention is set forth below with reference to FIGS. 8–11. FIG. 8 is a block diagram of a third embodiment of the memory 20 constructed according to the present invention. The third embodiment of the present invention eliminates the need for a separate tag memory 42 (shown in FIG. 1) or any other separate memory locations, e.g., the d-bit memory storage 108 (shown in FIG. 4). The structure of the memory 20 used in the third embodiment is illustrated in FIG. 8. The data storage 801 includes N memory lines, i.e., memory line[0] 812, through memory line[N-1] 816. In contrast to the previous embodiments where a portion of the data storage 72 was reserved for data ownership codes, in the third embodiment the entire data storage 801 can be used to store data. Memory line[0] 812 includes a portion 810 that alternatively stores data or ownership codes depending upon the status of the memory line[0] 812, i.e., whether the memory line is owned or unowned. Memory portion 810 includes a CHECK field 802, a count field 806, and a processor identification (ID) field 808. The CHECK field 802 is similar to the CHECK field 114 described above. In the third embodiment the CHECK field 802 is 32 bits in length. As described below, the CHECK field 802 is set to a distinct GONE value when a processor owns the data. The count field 806 has a length of 8 bits. As will be described below, the number of bits in the count field 806 is, preferably, at least one bit larger than the number of bits that are necessary to represent the number of cache memories in the computer system. The ID field 808 contains data representing a processor that owns the data in the requested memory line, i.e., the processor whose associated cache memory 30, 32, 34, 36 holds the data. Although a particular embodiment is described above, it will be understood to persons skilled in the art that the size of each of the fields, 802, 806, 808 can vary.

The memory 20 includes a memory controller 822. The memory controller 822 is coupled to the data storage 801 via the address line 96A, the control line 98A, and the data line 100A, as shown in FIG. 8. The components of memory controller 822 are similar to the memory controller 94 described above with reference to FIG. 5, therefore, like reference numerals will be used for like components. The memory controller 822 differs from memory controller 94, and thus from memory sequencer 122, only in that the controller includes a cache identification table 823. The functions performed by memory controller 822 are set forth below. The memory controller 822 is coupled to the processors 12, 14, 16, 18 via the first bus 22, as described above. The Cache identification table 823 includes data representing valid cache identifiers and is described in greater detail below.

Figure 9A:
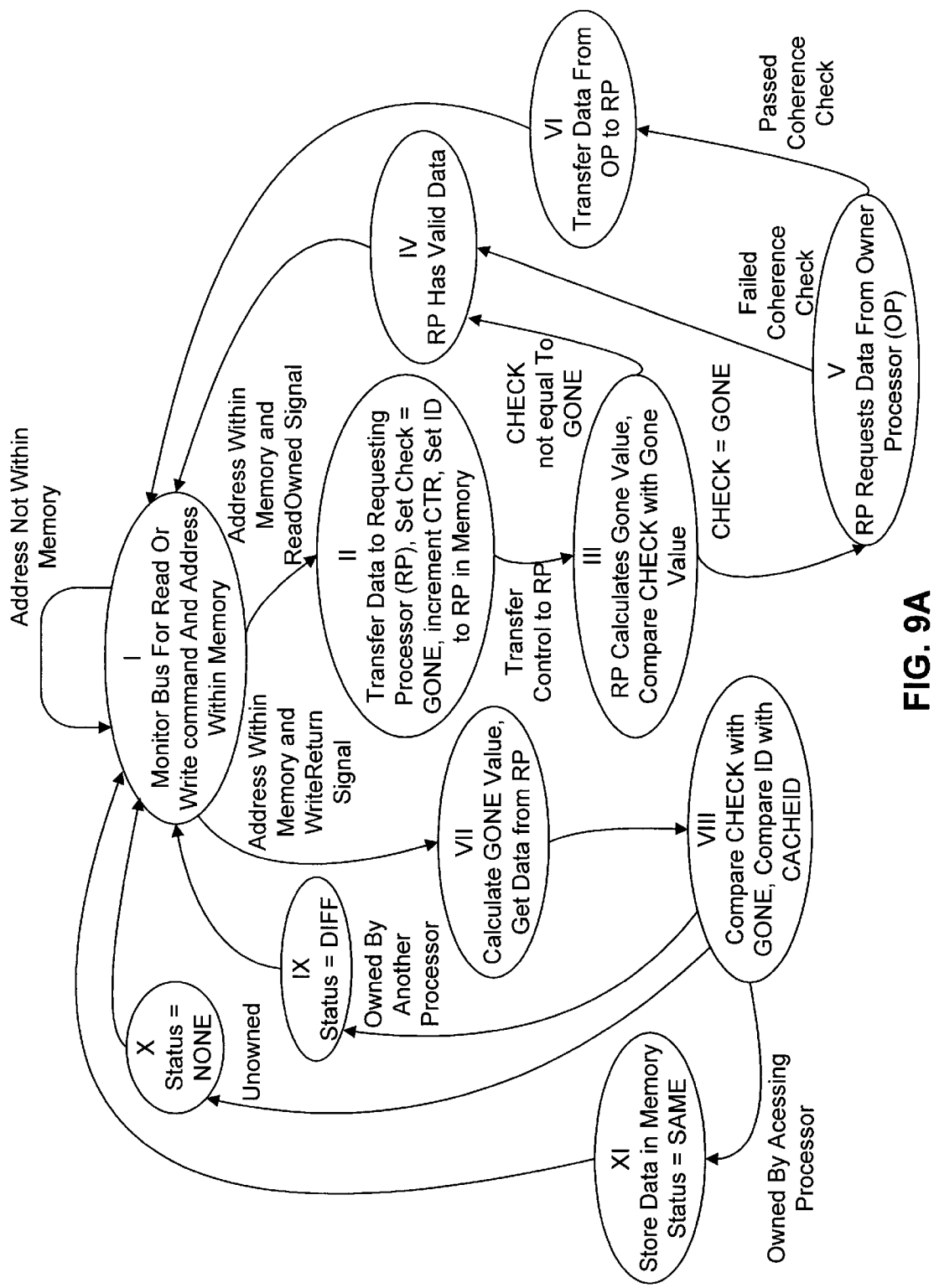
FIG. 9A is a first state diagram of the computer system memory access according to the third embodiment of the present invention.

Referring now to FIG. 9A, a state diagram of the memory access system constructed according to a third embodiment is shown. FIG. 9A shows the significant states of the memory 20 and the processors 12, 14, 16, 18. Other states may be necessary to fully implement a memory access according to the third embodiment. These additional states will be understood by those skilled in the art. FIG. 9A shows the significant states for a ReadOwned and a WriteReturn command received by the memory 20.

The state diagram illustrated in FIG. 9A represents the state of the memory 20 and the processors 12, 14, 16, 18 when the receiving processor compares the value of the CHECK field 802 and the GONE value. Referring now to FIG. 9A, the memory sequencer 122 receives a command signal through the CMD input, address data through the input to the address buffer 126, and a CacheId signal through the CacheId input, as described above. The CacheId signal identifies the requesting processor 12, 14, 16, 18. When the memory sequencer 122 receives a ReadOwned, WriteReturn, or other appropriate command signal, the memory sequencer 122 generates a signal and asserts the signal on line 130 for the address buffer 126 to capture the address and to transfer the address to the memory sequencer 122. The address buffer 126 transfers the address by asserting a signal on line 96A, which is coupled to the address input/output of the memory sequencer 122. The memory sequencer 122 then analyzes the address to determine if the address is for a location within the data storage 801. As shown in FIG. 2, the computer system 10 has only one memory 20. However, as described above, computer systems may have multiple memories. When a computer system has multiple memories, the memory sequencer 122 must determine if the address is within its data storage 801. If the address is not for an address within its data storage 801, the memory sequencer 122 remains in state I as shown in FIG. 9A.

If the address is for a location within the data storage 801 and a ReadOwned command signal is received on the CMD input, the memory sequencer 122 accepts the request and the system enters state II. For this explanation, it will be assumed that the received address is 0, and the memory line to be accessed is the first memory line in the data storage 801, i.e., line[0] 812. In state II, the data storage 801 transfers the contents of line[0] to the memory sequencer 122 via line 100A. The memory sequencer 122 then transfers the data to the data bus where the requesting processor receives the data and stores it in its associated cache memory. The memory controller 822 determines the GONE value for the requested address and stores this value in the CHECK field 802 of line[0] 812. Techniques for determining the GONE value are described above. The memory controller 822 also stores a representation of the requesting processor in the ID field 808. The representation of the requesting processor can be the CacheId received by the memory sequencer 122. The memory sequencer 122 also increments the count field 806. The count field 806 is incremented every time the data in line[0] 812 is accessed using ReadOwned. The memory sequencer 122 modifies the CHECK field 802, the count field 806, and the ID field 808 even though it has not determined whether the requested data was present in the data storage 801 before the modification or whether the requested data was owned by another processor. As will be discussed below, the entire data in memory line[0] 812 is sent to the requesting processor. As described above, the data is the data in memory line[0] 812 before the memory sequencer 122 updates the CHECK field 802, the count field 806, and the ID field 808. The requesting processor then determines the state of the memory line.

A memory line 812, 814, 816 can be in one of three states, unowned, truly-owned, or falsely-owned. A memory line, e.g., line[0] 812, is unowned if the data in the CHECK field 802 is not equal to the GONE code. Unowned data can be used immediately by the requesting processor. A memory line 812 is truly-owned if the data in the CHECK field 802 is equal to the GONE code, the ID field 808 identifies the most recent owner and a coherence check is satisfied when the requesting processor fetches the data from the most recent owner processor. A memory line is falsely-owned when the memory line is not owned by any processor but the data in the CHECK field 802 happens to be equal to the GONE value. The false ownership is discovered when the requesting processor attempts to fetch the data from the apparent owner processor. The procedure for determining the state of the memory line is now described in greater detail.

After the data in the requested memory line, line[0] 812, is transferred to the requesting processor and the memory controller 822 modifies the CHECK field 802, the count field 806, and the ID field 808, as described above, the requesting processor determines the state of the requested data, and the system enters state III. In state III, the requesting processor determines the GONE value and compares the GONE value with the CHECK field of the requested data. If the data in the CHECK field is not equal to the GONE value then the data received by the requesting processor was unowned. Accordingly, the system transitions to state IV and the data received by the requesting processor is valid. On the other hand, if the CHECK field is equal to the GONE value then the data received by the requesting processor is either truly-owned data or falsely-owned data, as described above, and the system transitions to state V. In state V, the requesting processor determines the identity of the owner processor (OP). A representation of the owner processor is stored in the ID field of the requested data. The requesting processor requests that the data be transferred to it from the apparent owner processor. As a result of this request, the apparent owner processor returns a status code indicating that a coherence check has either passed or failed. A failed coherence status code is generated if either the requested memory line is not possessed by the apparent owner processor or if the memory line is in an inconsistent state. There are a variety of reasons why the owner processor can determine that it does not possess the requested memory line. These reasons include the owner processor determining that it does not have an associated cache memory, that the owner processor has an associated cache memory but does not have the requested address line, and that the data in the ID field of the requested data (that is stored in the cache of the requesting processor) does not identify a processor.

In rare situations, both the requesting processor and the apparent owner processor are attempting to become the owner of the data in the requested memory line. In this rare situation, the apparent owner processor receives the request from the requesting processor. The apparent owner processor then compares the count value in its copy of the memory line with the count value in the memory line from the cache of the requesting processor. If the requesting processor's count value is less than the apparent owner processor's count value, then the data in the apparent owner processor is invalid because the apparent processor received the data from the memory line after the requesting processor received the data from the memory line. Therefore, a failed coherence status code is returned to the requesting processor.

As discussed above, the number of bits in the count field 806 is preferably equal to at least one bit more than the number of bits necessary to represent each cache in the computer system 10. The reason for this field size is that the count value must be able to accurately handle the situation where each cache memory requests a copy of a memory line, via its associated processor. Accordingly, this accounts for all but one bit of the count field. The last bit is used to ensure that when the count value is incremented from all binary ones to all binary zeros, that subsequently requesting processors will be identifiable by previously requesting processors. The present invention ensures this by adding the extra bit and interpreting the count value as a signed integer. If the difference between the requesting processor's count value and the owner processor's count value is negative, a failed coherence status code is generated. As stated above, the count field is used to ensure that if two processors are requesting the same data, the second requesting processor, that is the processor that requested the data second, has invalid data because the first requesting processor modified the count field and the ID field in memory line 812. An example of this situation is described below with reference to FIG. 10.

If the requesting processor receives a failed coherence status code signal, the system transitions to state IV because the data received by the requesting processor from data storage 801 is valid. The system then returns to state I. If the requesting processor receives a passed coherence status code, the system transitions to state VI and the owner processor transfers the data to the requesting processor. The system then returns to state I.

While the system is in state I, if the memory sequencer 122 receives a WriteReturn command on the CMD line and the requested address is within the storage device 801 then the system transitions to state VII. With the WriteReturn command, only an owner processor 12, 14, 16, 18 may write to a memory line. When the system is in state VII, the memory sequencer 122 calculates the GONE value for the requested address and receives the data from the writing processor. The memory sequencer 122 then transitions to state VIII. In state VIII, the memory sequencer 122 compares the GONE value determined in state VII with the code contained in the check field 802 of the requested memory line 810 and compares the CacheId signal received from the control bus to the ID field 808 of the requested memory line 810. The data can only be written to the memory line if the requesting processor owns the data. Therefore, if the memory sequencer 122 determines that a different processor owns the memory line 810, the system transitions to state IX and memory sequencer 122 generates a DIFF status signal. If the memory sequencer determines that the memory line 810 is unowned, the system transitions to state X and the memory sequencer 122 generates a NONE status signal. If the requesting processor owns the memory line 810, the system transitions to state XI. In state XI, the memory sequencer 122 stores the data in the requested memory line 810 and generates a SAME status signal. After the memory sequencer 122 generates a status signal in either state IX, X or XI, the system returns to state I.

Those skilled in the art will recognize that the ReadOwned and WriteReturn updates can be pipelined, in that memory can be processing a second ReadOwned or WriteReturn request before the requesting processor has completed the processing of a previous ReadOwned or WriteReturn request.

Figure 9B:
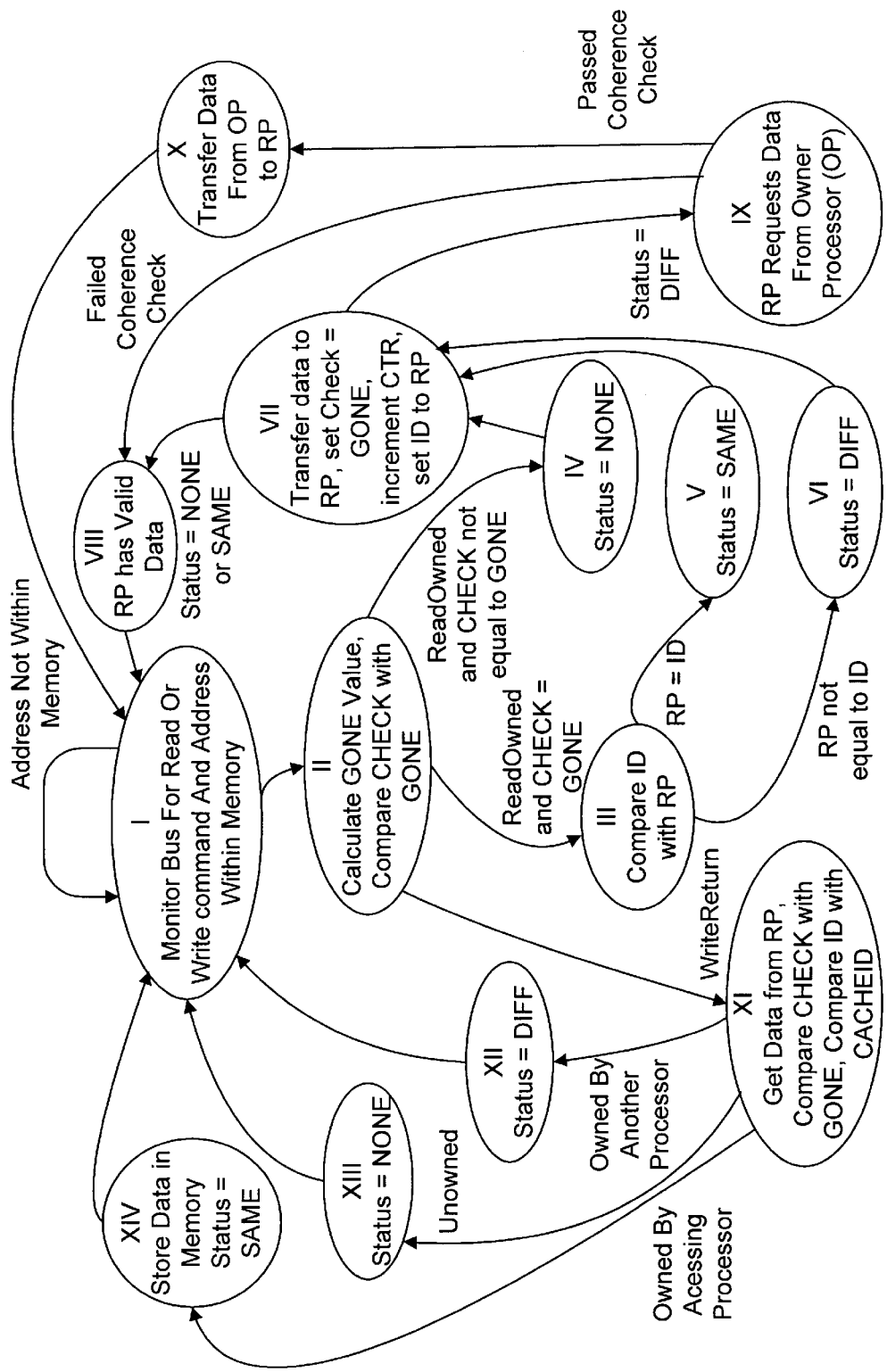
FIG. 9B is a second state diagram of the computer system memory access according to the third embodiment of the present invention.

Referring now to FIG. 9B, a fourth embodiment of the present invention will be described. FIG. 9B shows a state diagram of the fourth embodiment memory access system including the significant states of the memory 20 and the processors 12, 14, 16, 18. Other states may be necessary to fully implement a memory access according to the third embodiment. These additional states will be understood by those skilled in the art. The state diagram illustrated in FIG. 9B represents the state of the memory 20 and the processors 12, 14, 16, 18 when the memory sequencer 122 compares the value of the CHECK field 802 with the GONE value. In the preferred embodiment, the memory sequencer 122 compares the value of the CHECK field with the GONE value and generates the appropriate status signal as shown in FIG. 9B.

The fourth embodiment begins in state I monitoring the bus for read or write commands to the memory 20. If a requesting processor requests an address that is located within the data storage 801 and a ReadOwned or WriteReturn command signal is received on the CMD input, the memory sequencer 122 accepts the request and the system enters state II from state I. The technique for monitoring the bus in state I has been described above with reference to FIG. 9A. For this explanation, it will be assumed that the received address is 0, and the memory line to be accessed is the first memory line in the data storage 801, i.e., line[0] 812. In state II, the memory sequencer 122 calculates the GONE value and compares the GONE value with the CHECK value. If the CHECK value is not equal to the GONE value and the command is a ReadOwned then the data is not owned and the system transitions to state IV where the memory sequencer 122 generates a status signal that is equal to NONE. If the CHECK value is equal to the GONE value and the command is a ReadOwned then the system transitions to state III and memory sequencer 122 compares the ID value with the requesting processor's identification value (RPID). If the ID value is equal to the RPID, the system transitions to state V and the memory sequencer 122 generates a status signal that is equal to SAME. If the ID value is not equal to the RPID, the system transitions to state VI and the memory sequencer 122 generates a status signal that is equal to DIFF.

In one variation of the fourth embodiment of the present invention, the memory sequencer 122 is coupled to a Cache ID Table 823. If the value of the CHECK field is equal to the GONE value, the memory sequencer 122 will determine if the cache identified in the ID field 808 is invalid. If the ID field 808 does not identify a valid cache, the memory sequencer 122 will generate a NONE status signal even though the value of the CHECK field is equal to the GONE value. A similar variation could also be applied to the third embodiment. In the case of the variation to the third embodiment, the Cache ID Table would be checked within the requesting processor.

After setting the-status signal, the system transitions to state VII where the memory sequencer 122 transfers the data to the requesting processor, sends the status signal to the requesting processor, stores the GONE value in the CHECK field of line[0] 812, increments the count field [0] 806, and sets the ID field ID[0] 808 equal to the requesting processor identification (RPID), as described above. The memory sequencer 122 increments the count field 806 each time the data in line[0] 812 is accessed using ReadOwned. The memory sequencer 122 modifies the CHECK field 802, the count field 806, and the ID field 808 even though it has not determined whether the requested data was present in the data storage 801 before the modification or whether the requested data was owned by another processor. As will be discussed below, the entire unmodified data is sent to the requesting processor. As described above, the unmodified data is the data in memory line[0] before the memory sequencer 122 updates the CHECK field 802, the count field 806, and the ID field 808. The requesting processor then determines the state of the memory line.

As described above, a memory line 812, 814, 816 can be in one of three states, unowned, truly-owned, or falsely-owned The procedure for determining the state of the memory line is now described in greater detail.

After the data in the requested memory line, line[0] 812, is transferred to the requesting processor and the memory controller 822 modifies the CHECK field 802, the count field 806, and the ID field 808, as described above, the requesting processor determines the state of the requested data. If the status signal is equal to either NONE or SAME, the requesting processor determines that the data received in state VII is valid and the system transitions to state VIII and then transitions back to state I. If the status signal is equal to DIFF, the system transitions to state IX where the requesting processor determines whether the data is truly-owned or falsely-owned. In state IX, the requesting processor requests data from the apparent owner processor (OP). If a coherence check fails, as described above, the data is falsely owned and the system transitions to state VIII since the requesting processor has valid data. If a coherence check passes, the owner processor transfers the data to the requesting processor as shown in state X and then the system transitions to state I.

As described above, a failed coherence status code is generated if either the requested memory line is not possessed by the apparent owner processor or if the memory line is in an inconsistent state. There are a variety of reasons why the owner processor can determine that it does not possess the requested memory line. These reasons include the owner processor determining that it does not have an associated cache memory, that the owner processor has an associated cache memory but does not have the requested address line, and that the data in the ID field of the requested data (that is stored in the cache of the requesting processor) does not identify a processor.

As described above, in rare situations, both the requesting processor and the apparent owner processor are attempting to become the owner of the data in the requested memory line. With respect to the fourth embodiment illustrated in FIG. 9B, in this rare situation the apparent owner processor receives a request from the requesting processor. The apparent owner processor then compares the count value in its copy of the memory line with the count value in the memory line from the cache of the requesting processor. If the requesting processor's count value is less than the apparent owner processor's count value, then the data in the apparent owner processor is invalid and a failed coherence status code is returned to the requesting processor. The technique for incrementing the count value is described above.

While the system is in state I, if the memory sequencer 122 receives a WriteReturn command on the CMD line and the requested address is within the storage device 801 then the system transitions to state XI. With the WriteReturn command, only an owner processor 12, 14, 16, 18 may write to a memory line. In state XI the memory sequencer 122 calculates the GONE value for the requested address, receives the data from the writing processor, compares the GONE value with the code contained in the check field 802 of the requested memory line 810 and compares the CacheId signal received from the control bus to the ID field 808 of the requested memory line 810. The data can only be written to the memory line if the requesting processor owns the data. Therefore, if the memory sequencer 122 determines that a different processor owns the memory line 810, the system transitions to state XII where the memory sequencer 122 generates a DIFF status signal. If the memory sequencer determines that the memory line 810 is unowned, the system transitions to state XIII and the memory sequencer 122 generates a NONE status signal. If the requesting processor owns the memory line 810, the system transitions to state XIV. In state XIV, the memory sequencer 122 stores the data in the requested memory line 810 and generates a SAME status signal. After the memory sequencer 122 generates a status signal the system returns to state I.

Again, those skilled in the art will recognize that the ReadOwned and WriteReturn updates can be pipelined, in that memory can be processing a second ReadOwned or WriteReturn request before the requesting processor has completed the processing of a previous ReadOwned or WriteReturn request.

Figure 10:
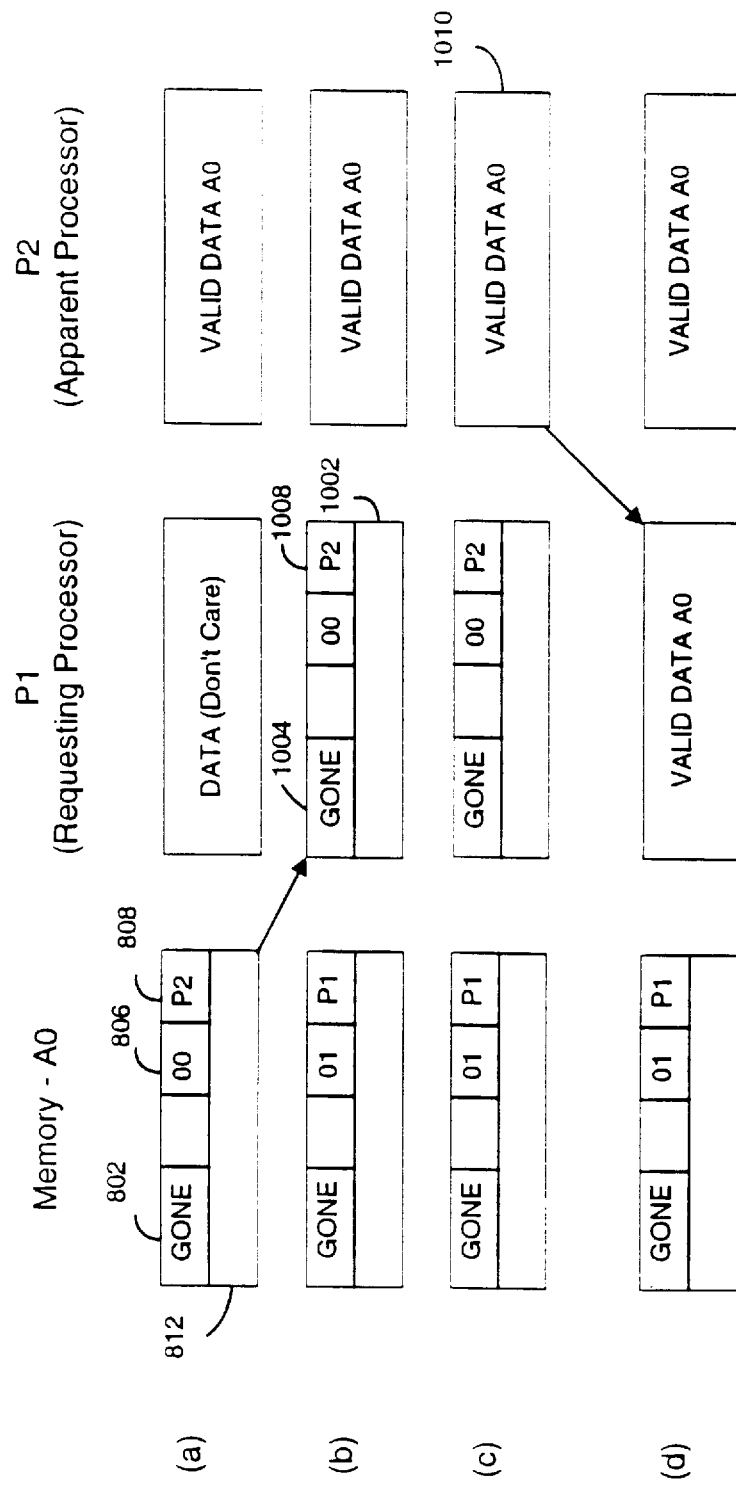
FIG. 10 is a first example of a computer system memory access according to the third embodiment of the present invention.

FIG. 10 is an illustration of the contents of memory 20 and the cache of two processors during a ReadOwned command according to the fourth embodiment of the memory system. FIG. 10 is described below with reference to the state diagram of FIG. 9B. In FIG. 10(a) the memory 20 includes a memory line 812. A first processor (P1) sends a signal to the memory sequencer 122 requesting the data on memory line 812. As described above, P1 sends additional signals, e.g., CacheId, to the memory sequencer 122. If the requested memory line is in memory 20, the system transitions to state II, as shown in FIG. 9B. The memory sequencer 122 determines the GONE value and compares the value in the CHECK field 802 with the GONE value. Since the value of the CHECK field 802 is equal to the GONE value the system transitions to state III. The memory sequencer 122 then compares the value of the ID field 808 with the identification of the requesting processor. The value of the ID field 808 corresponds to a second processor P2 (apparent owner). Therefore, the system transitions to state VI and the memory sequencer 122 generates a status signal equal to DIFF.

The system then transitions to state VII and the memory sequencer 122 transmits the data to the cache of P1. In addition, the memory sequencer stores the GONE value in the CHECK field 802 of the memory line 812, increments the count field 806 from "00" to "01", only the two least significant bits are shown in FIG. 10, and stores a representation of the requesting processor in the ID field 808, i.e., "P1". Accordingly, FIG. 10(b) illustrates the situation as the system transitions to state VII. After receiving the data, the requesting processor interprets the status signal sent by the memory sequencer. If the status signal is equal to either NONE or SAME then the data received by the requesting processor from the memory sequencer 122 is valid data and the system transitions to state VIII. In the present example, the status signal is equal to DIFF. Therefore, the system transitions to state IX and the requesting processor requests data from the owner processor (OP), that is, the processor identified by the ID field 1008, i.e., P2. This request is shown in FIG. 10(c). In this example, the A0 data 1010 exists in P2. Therefore, P2 generates a passed coherence status code that is received by the requesting processor and the system transitions to state X. In state X P2 transfers the A0 data 1010 to P1 as shown in FIG. 10(d) and the A0 data is stored in the cache of P1.

Figure 11:
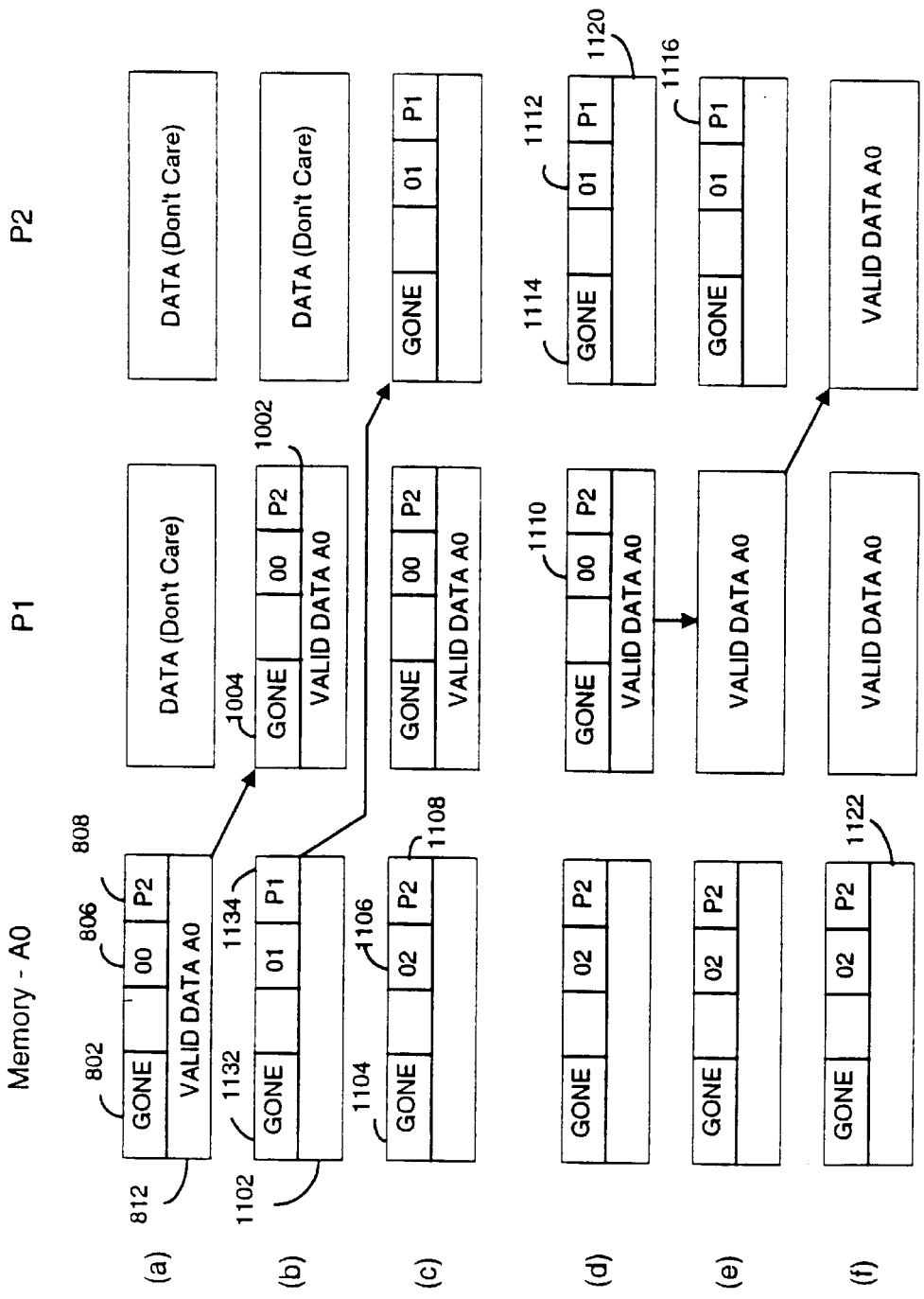
FIG. 11 is a second example of a computer system memory access according to the third embodiment of the present invention.

Another example of the fourth embodiment is shown in FIG. 11 and is described below with reference to the state diagram illustrated in FIG. 9B. FIGS. 11(a)–(b) illustrate the same memory transfer steps described above with reference to FIGS. 10(a)–(b). Accordingly, FIG. 11(b) illustrates the contents of memory as the system transitions to state VII. However, before the first requesting processor P1 determines the value of the status signal, P2 sends another ReadOwned command to the memory sequencer 122. The memory sequencer 122 compares the value of the CHECK field 1132 with the GONE value and the value of the ID field 1134 with the second requesting processor identification, i.e., P2. As a result of these comparisons the memory sequencer generates a DIFF status signal and transfers the (invalid) data to P2. In addition, the memory sequencer stores the GONE value in the CHECK field 1104, increments the count field 1106, from "01" to "02", and stores a representation of the second requesting processor P2 in the ID field 1108. FIG. 11(c) illustrates the contents of the memory 20, the P1 cache, and the P2 cache when the system state for both the first request and the second request is at state VII. Thereafter, P1 determines that the status signal is equal to DIFF. Therefore, the system state for the first request transitions to state IX. P1 reads the ID field in its memory line 1002 and determines that processor P2 owns the A0 data. Accordingly, P1 requests a transfer of the A0 data from P2, as shown in FIG. 11(d). P2 compares its CHECK field 1114 to the GONE value and determines that they are equal. Therefore, P2 compares the value of the count field 1110 of P1, i.e., "00", with the count field 1112 of P2, i.e., "01". Since the count field 1110 of P1 is less that the count field 1112 of P2, P2 determines that its data 1120 is invalid because it is in an inconsistent state. Therefore, P2 transmits a failed coherency status code to P1. The system transitions to state VIII for the first memory request and P1 overcomes the falsely-owned data state and determines that the data in its cache memory line 1002 is valid data as shown in FIG. 11(e).

Thereafter, P2 continues processing the second memory request. P2 identifies P1 as the owner of the A0 data because of the value in the ID field 1116 in P2's cache memory. P2 requests the A0 data from P1. P1 compares its CHECK field 1004 with the GONE value. As described above, they are equal. Therefore, P1 compares the count field 1110 of P1 with the count field 1112 of P2. Since the count field 1112 of P2 (the new requesting processor) is larger than the count field 1110 of P1, P1 generates a passed coherency-status code and transmits this code to P2. The system then transitions to state X and P1 transfers the A0 data to P2. The system then returns to state I. Future memory requests will receive the data 1122 in memory 20 indicating that the data is owned by processor P2.

While the present invention has been described with reference to certain preferred embodiments, those skilled in the art will recognize that various modifications may be provided. For example, the present invention is described for performing certain memory operations, the present invention may be used to perform any operation. In the second embodiment, the g bit field need not comprise only one bit. The g bit field may comprise more than one bit and may contain data in addition to whether or not the check field contains the code for the address. These and other variations upon and modifications to the preferred embodiments are provided for by the present invention. For example, the NONE, DIFF, and SAME indicators can have separate wires or can be encoded into two wires.

What is claimed is:
1. A method for reading contents of a requested memory address in a first memory device, comprising the steps of:
receiving a first address signal corresponding to the requested memory address;
transmitting data contained in a first memory address location, corresponding to the requested memory address, to a second memory address location, located in a second memory device associated with said requesting processor; and
storing an ownership code in said first memory address location, said ownership code being stored in at least portions of said first memory address location containing said data, before determining if said transmitted contents of said first memory address location is valid data.
2. The method of claim 1, further comprising the step of:
determining a GONE code corresponding to the requested memory address.
3. The method of claim 2, wherein said step of storing an ownership code includes the steps of:
storing said GONE code in said first memory address location;
incrementing a count field in said first memory address location; and
storing a processor identifier in said first memory address location, said processor identifier representing said requesting processor.
4. The method of claim 2, further comprising the steps of:
comparing said GONE code with a portion of said contents of said first memory address location; and
generating a status signal representing a result of said comparing step.
5. The method of claim 4, further comprising the step of:
determining if a first owner identification code corresponds with a valid processor device by comparing said first owner identification code to a predetermined table of valid processor device codes, said first owner identification code located in a portion of said first memory address location.
6. The method of claim 4, wherein said status signal represents one of a NONE status and a DIFF status, said NONE status indicating that the contents of the first memory address location are valid data, said DIFF status indicating that no determination as to the whether the contents of the first memory address location are valid data has occurred.
7. The method of claim 6, further comprising the step of:
requesting the contents of a third memory address location, corresponding to the requested memory address located in a third memory device associated with a third processor, said third memory device represented in a portion of said transmitted contents of said first memory address location, if a DIFF status signal is generated; and
transferring the contents of said third memory address location to said second memory address location if a coherency check is passed.
8. The method of claim 3, further comprising the steps of:
comparing said GONE code with a CHECK value in said second memory address location;
reading a second owner identification code in said second memory address location, if said GONE code is equal to said CHECK value in said second memory address location, said owner identification code identifying an owner processor having a third memory address location corresponding to the requested memory address;

requesting the contents of said third memory address location, if said GONE code is equal to said CHECK value in said second memory address location; and transmitting one of an error code to said requesting processor if said third memory address location does not contain the requested memory address, and the contents of said third memory address location if said third memory address location contains the contents of the requested memory address.

9. The method of claim 8, wherein contents of said second memory address location are equal to the contents of the requested memory address if said error code is transmitted.

10. The method of claim 8, wherein said error code is transmitted if one of the following occurs:

said second owner identification code does not identify a processor;

said owner processor, identified by said second owner identification code, does not include the requested memory address; and said owner processor is in an inconsistent state.

11. The method of claim 8, further comprising the steps of:

receiving said contents of said third memory address location representing the contents of the requested memory address if said error code is not transmitted.

12. A memory system for a computer system having a plurality of processors, the memory system comprising:

a data storage device, having inputs and outputs for receiving and outputting data, the data storage device having a plurality of memory lines, each memory line having a portion for alternatively storing one of data and an ownership code; and a memory controller, having inputs and outputs disposed to receive and transmit commands, addresses, and data from the processors, said memory controller coupled to said data storage for alternatively storing and retrieving data and ownership code.

13. The memory system of claim 12 wherein said ownership codes include one of a check field, count field, and identification field.

14. The memory system of claim 13, wherein a first of said processors comprises:

a cache memory, having inputs and outputs for receiving and outputting data, the cache memory having memory lines to store the contents of a requested memory line of said memory lines;

a cache memory controller, coupled to said cache memory, for requesting the contents of said requested memory line, for comparing a GONE code that is associated with said requested memory line with the contents of said check field of said requested memory line, and for requesting the contents of said requested memory line from a second of said processors in response to said comparison.

15. The memory system of claim 14, wherein the GONE code is a result of a hashing function.

16. The memory system of claim 13, wherein the data storage device has data inputs and outputs, a control input and address inputs and outputs and wherein the memory controller comprises:

a data buffer, having inputs and outputs coupled to the data inputs and outputs of the data storage device, for receiving and outputting data;

an address buffer, having inputs coupled to the plurality of processors and having inputs and outputs coupled to the address inputs of the data storage device, for receiving addresses; and a memory sequencer, having inputs and outputs, the outputs coupled to the control input of the data storage device, the address buffer, and the data buffer, for generating signals that instruct the data storage device to store and retrieve data, for modifying said memory line portion by storing said GONE value, for storing said processor identification code and incrementing said count field, and for returning a status signal indicating whether the data storage device previously contained the GONE value.

17. The memory system of claim 16, wherein the memory sequencer contains combinational logic.

18. The memory system of claim 16, further comprising a memory identification storage device, disposed to receive signals from said memory sequencer, said memory identification storage device having representations of valid cache memory identification codes.

19. The memory system of claim 14, further comprising a memory identification storage device, disposed to receive signals from said first of said processors, said memory identification storage device having representations of valid cache memory identification codes.

20. The memory system of claim 14, wherein each memory line of the data storage device has an unique address and the GONE code is based on the address.

21. The memory system of claim 20, wherein the GONE code held in said portion of said memory line is a result of a hashing function performed on the address of said memory line.

22. A memory system comprising:

a data storage device comprising a plurality of memory locations; and a memory controller which controls writing of data to said data storage device and reading of data from said data storage device, comprising:

means, responsive to a read request received from a processor, for retrieving data from a memory location in said data storage device corresponding to an address contained in said read request and for transmitting said retrieved data to said processor; and means for storing data which identifies said processor to said memory location corresponding to said address contained in said read request.

23. A memory system as set forth in claim 22 wherein said memory controller further comprises:

means for determining a GONE value for said address and for storing said GONE value to said memory location corresponding to said address contained in said read request.

* * * * *